(12) United States Patent
Kawakami

(10) Patent No.: US 8,800,982 B2
(45) Date of Patent: Aug. 12, 2014

(54) CLAMPING DEVICE

(75) Inventor: Takayuki Kawakami, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 217 days.

(21) Appl. No.: 13/579,411

(22) PCT Filed: Feb. 15, 2011

(86) PCT No.: PCT/JP2011/053131
§ 371 (c)(1),
(2), (4) Date: Aug. 23, 2012

(87) PCT Pub. No.: WO2011/108352
PCT Pub. Date: Sep. 9, 2011

(65) Prior Publication Data
US 2012/0319340 A1 Dec. 20, 2012

(30) Foreign Application Priority Data

Mar. 1, 2010 (JP) ................................. 2010-044126
Jun. 22, 2010 (JP) ................................. 2010-141560

(51) Int. Cl.
*B23Q 3/00* (2006.01)
*B23Q 1/00* (2006.01)
*B23Q 3/06* (2006.01)

(52) U.S. Cl.
CPC ..................................... *B23Q 1/009* (2013.01)
USPC ........................... 269/48.3; 269/309; 269/310

(58) Field of Classification Search
USPC ......................................... 269/48.3, 309, 310
See application file for complete search history.

(56) References Cited

U.S. PATENT DOCUMENTS

| | | | |
|---|---|---|---|
| 6,095,509 A | 8/2000 | Yonezawa | |
| 6,988,720 B2 * | 1/2006 | Kawakami | 269/309 |
| 7,303,186 B2 * | 12/2007 | Yonezawa et al. | 269/309 |
| 8,087,650 B2 * | 1/2012 | Kuroda et al. | 269/306 |
| 8,235,370 B2 * | 8/2012 | Kawakami | 269/310 |
| 8,246,029 B2 * | 8/2012 | Kawakami | 269/310 |
| 2001/0028138 A1 * | 10/2001 | Charles | 269/48.1 |
| 2006/0049568 A1 * | 3/2006 | Yonezawa et al. | 269/309 |
| 2006/0226591 A1 | 10/2006 | Yonezawa et al. | |
| 2007/0138725 A1 * | 6/2007 | Yonezawa et al. | 269/309 |
| 2007/0170630 A1 * | 7/2007 | Kuroda et al. | 269/309 |
| 2009/0267281 A1 * | 10/2009 | Kitamura et al. | 269/309 |
| 2009/0315239 A1 * | 12/2009 | Yonezawa et al. | 269/309 |
| 2011/0133381 A1 | 6/2011 | Kawakami | |
| 2012/0174351 A1 * | 7/2012 | Haruna | 24/463 |

FOREIGN PATENT DOCUMENTS

| | | | |
|---|---|---|---|
| DE | 4 020 981 | 1/1992 | |
| EP | 1600261 A2 * | 11/2005 | B25B 5/08 |
| EP | 1679151 A1 * | 7/2006 | B23Q 3/00 |
| JP | 11-188551 | 7/1999 | |
| JP | 2004-195583 | 7/2004 | |
| JP | 2006-123016 | 5/2006 | |
| JP | 2010-036314 | 2/2010 | |
| JP | 2010-125537 | 6/2010 | |
| WO | WO-2005/009676 | 2/2005 | |

* cited by examiner

*Primary Examiner* — Lee D Wilson
*Assistant Examiner* — Alvin Grant
(74) *Attorney, Agent, or Firm* — Jordan and Hamburg LLP

(57) ABSTRACT

A clamping device increases the diameter of a gripping assembly that is inserted into a hole in a workpiece and thus grips the inner circumferential surface of the hole, and particularly relates to such a clamping device that is adapted so that, in the vicinity of a scraper, no clearance occurs between the gripping assembly and a clamp rod, and the scraper. The clamping device is capable of enhancing the durability of a scraper, reducing the amount of pressurized air consumed by blowing, and ensuring the strength of a clamp rod against pulling and so on.

6 Claims, 22 Drawing Sheets

CLAMPING DEVICE

BACKGROUND OF THE INVENTION

The present invention relates to a clamping device that increases the diameter of a gripping assembly that is inserted into a hole in a workpiece and thus grips the inner circumferential surface of the hole, and particularly relates to such a clamping device that is adapted so that, in the vicinity of a scraper, no clearance occurs between the gripping assembly and a clamp rod, and the scraper.

From the past, clamping devices of various types (so called hole clamps or expansion clamps) have been put into practical use, with which it is arranged, by expanding the diameter of a grip claw section of a gripping assembly that has been inserted into a hole in a workpiece as by a clamp rod, to grip the inner circumferential surface of the hole and to pull the workpiece towards the clamp main body so as to clamp it.

For example, the clamping device described in Patent Document #1 comprises a clamp main body, a gripping assembly, a clamp rod for increasing the diameter of the gripping assembly, a hydraulic cylinder that drives the clamp rod. The gripping assembly comprises four grip forming members, and grip claw sections are formed on these grip forming members, with their cross sectional shapes orthogonal to the axis of the clamp rod being formed as flattened letter D shapes. With regard to a lower portion and an intermediate portion of the clamp rod, the cross sectional shapes orthogonal to the axis of the clamp rod are formed as circular rod shapes, and a tapered section is formed at the upper end portion of the clamp rod, having an inverted four cornered conical shape whose diameter becomes progressively larger upwards. Base end flange portions are formed at the lower ends of the grip forming members, and also a guidance and support mechanism is provided to the clamp main body that guides and supports the base end flange portions of the grip forming members so that they are shiftable in the horizontal direction.

Moreover, in Patent Document #2, there are provided a clamp main body, a one piece annular collet (i.e. a gripping assembly), a pull rod (i.e. a clamp rod), a hydraulic cylinder that drives the pull rod. The collet is made so as to be capable of being elastically deformed so that its external diameter increases, due to a single vertically oriented slit therein.

Since, with this type of clamping device, the upper end portions of the gripping assembly and the clamp rod are constructed so as to be inserted through a through hole in the upper end portion of the clamp main body and to extend upwards, accordingly, in known Patent Document #3 filed by the applicant of the present application, in order for foreign matter such as swarf or the like not to be allowed to enter into the interior of the clamping device through an annular clearance between the through hole and the outer circumferential surfaces of the gripping assembly and the clamp rod, it has been proposed for the clamping device to include a scraper provided to the clamp main body and having a certain flexibility, so as to block up the annular clearance described above.

With this clamping device, the gripping assembly is divided into sections by four slits so as to form four grip forming members, and the clamp rod has an intermediate rod section whose cross section is circular and a tapered section that extends at the upper end of this intermediate rod section. The tapered section is formed with four tapered surfaces that contact against grip claw sections of the four grip forming members.

Patent Document #1: German Patent 4, 020, 981.
Patent Document #2: Japanese Laid Open Patent Publication Heisei 11-188551.
Patent Document #3: Japanese Laid Open Patent Publication 2010-125537.

With the clamping device of Patent Document #3, the workpiece is pulled towards the clamp main body after the clamp rod has been driven downwards for clamping, after the diameter of the four grip forming members has been increased, and after the inner circumferential surface of the hole in the workpiece has been gripped. When the external diameter of these four grip forming members is increased, the slits between the grip forming members are enlarged, and those four slits remain open.

Moreover, when the clamp rod moves relatively downwards with respect to the gripping assembly, not only is the clearance between the four grip forming members and the clamp rod enlarged (i.e."internal clearance"), but also, in the vicinity of the scraper, the cross section of the gripping assembly and the clamp rod (i.e. the cross section orthogonal to the axis of the clamp rod) becomes non circular.

For this reason, not only is it not possible to block the four slits described above and the internal clearance described above with the scraper, but also a clearance appears between the external periphery of the gripping assembly and the clamp rod and the scraper (i.e. "outer peripheral clearance"), and it is not possible to block this outer peripheral clearance adequately by the scraper.

Due to the above, when the clamped workpiece is subjected to machining, foreign material such as swarf and so on may enter through the various clearances described above into the interior of the clamping device, and this causes faults of the clamping device.

On the other hand, in order to prevent ingress of foreign material such as swarf during machining, pressurized air used to be supplied to the interior of the clamp main body, so that this pressurized air is ejected from the various clearances described above. However, since the various clearances described above are large, the level of consumption of pressurized air becomes great, and the cost of supplying this pressurized air becomes high.

Moreover, there is the problem that the edge portions in the widthwise direction of the grip claw sections of the grip forming members may bite into the scraper and may damage the scraper, so that the durability of the scraper is remarkably decreased.

On the other hand, sometimes a compact clamping device is needed, since in some cases the diameter of the hole formed in the workpiece for clamping is about 6 mm. In the case of such compact clamping device, the external diameter of the grip claw sections of the gripping forming members also becomes about 6 mm, so that the diameter of the cross section of the clamp rod is about 2 or 3 mm. Since, with such compact clamping device, the diameter of the intermediate section of the clamp rod (horizontal cross section is circular) thus becomes extremely small, accordingly it becomes difficult to ensure that the clamp rod has sufficient pulling strength for driving the clamping action.

The objects of the present invention are to present a clamping device that is capable of enhancing the durability of a scraper, to present a clamping device that is capable of reducing the amount of pressurized air consumed by blowing, to present a clamping device that is capable of ensuring the strength of a clamp rod against pulling, and so on.

SUMMARY OF THE INVENTION

The present invention presents a clamping device comprising a clamp main body, a gripping assembly that passes through a through hole in an upper end portion of the clamp main body and extends upwards and is capable of gripping an inner circumferential surface of a hole in a workpiece, a clamp rod that extends in a vertical direction and is engaged with the gripping assembly, a scraper made from rubber or synthetic resin that blocks an annular clearance on an outer circumferential surface of the gripping assembly and the clamp rod within the through hole, and a drive means that drives the clamp rod forwards and backwards, characterized in that: the gripping assembly comprises one or a plurality of grip forming members positioned at an outer circumference of the clamp rod; the clamp rod comprises an intermediate rod section at an intermediate portion, and a tapered section at its upper end side portion that continues upwards from the intermediate rod section, that is formed so that its external diameter increases progressively upwards, and so that is capable of driving the one or a plurality of grip forming members in a direction to increase their external diameter; the tapered section has one or a plurality of tapered flat surfaces that contact with a grip claw section or sections of the one or a plurality of grip forming members in a surface contacting manner, and one or more partial conical surfaces having radius increasing progressively upwards each of which is formed respectively between edges of lower portions of the one or a plurality of tapered flat surfaces; and, in the vicinity of the scraper, the cross section of the one or a plurality of grip forming members and the clamp rod orthogonal to an axis of the clamp rod is formed as circular throughout the unclamping state to the clamping state.

According to the present invention: since the gripping assembly comprises the one or a plurality of grip forming members positioned at the outer circumferential side of the clamp rod; the clamp rod comprises the intermediate rod section at its intermediate portion, and the tapered section that continues upwards from the intermediate rod section, that is formed so that its external diameter increases in the upward, and moreover that is capable of driving the one or a plurality of grip forming members in the direction to increase their external diameter; the tapered section has one or a plurality of tapered flat surfaces that contact with a grip claw section or sections of the one or a plurality of grip forming members in a surface contacting manner, and one or more partial conical surfaces each of which is formed respectively between edges of lower portions of the one or a plurality of tapered flat surfaces, and whose radius increases progressively upwards; and, in the vicinity of the scraper, the cross section of the one or a plurality of grip forming members and the clamp rod orthogonal to the axis of the clamp rod is formed as circular; throughout the unclamping state to the clamping state accordingly the following advantages are obtained.

When the clamp rod is driven to the clamping side, in the vicinity of the scraper, the external diameter of the circular cross section of the grip forming members and the clamp rod is increased, the internal circumferential portion of the scraper is elastically deformed in the circumferential direction and in the radial direction, and a state is established in which almost no clearance is generated between the gripping assembly and the clamp rod, and the scraper. Accordingly it becomes possible to stop blowing air during the clamp operation, since it is possible to prevent ingress of foreign matter into the clamp main body. Moreover, even if air blowing is continued, it is possible to reduce the amount of consumption of pressurized air remarkably, so that an advantage of energy saving is obtained.

Since, in the vicinity of the scraper, the edges of the one or a plurality of grip forming members do not project further than the outer circumstantial surface of the clamp rod, accordingly it is possible to ensure the durability of the scraper, because the scraper does not suffer damage due to the edges of the one or a plurality of grip forming members.

In addition to the constitution of the present invention as described above, it would also be acceptable to arrange to employ following various constitutions.

(1) During the unclamped state, the lower end portion of the partial conical surface of the clamp rod may be contacted against the scraper.

Since, according to this constitution, during the unclamped state, the lower end portion of the partial conical surface of the clamp rod is contacted against the scraper, accordingly, from just after the shifting downwards of the clamp rod starts together with clamp driving, it is possible elastically to deform the internal circumferential portion of the scraper with the partial conical surfaces of the tapered section, so that almost no clearance is generated between the scraper and the clamp rod.

(2) The cross section of the grip claw section of the grip forming member orthogonal to the axis of the clamp rod may be formed in a flattened letter D shape.

Since, according to this constitution, the cross section of the grip claw section of the grip forming member orthogonal to the axis of the clamp rod is formed in a flattened letter D shape, accordingly, by engaging the grip forming member to the tapered flat surface of the clamp rod, it is possible to form the cross section of the clamp rod and the gripping assembly orthogonal to the axis of the clamp rod into a circular shape.

(3) The tilt angles of the tapered flat surface and of the partial conical surface with respect to the axis of the clamp rod may be formed so as to be the same.

Since, according to this constitution, the tilt angles of the tapered flat surface and of the partial conical surface with respect to the axis of the clamp rod are formed so as to be the same, accordingly it is still possible to maintain the cross section of the grip forming member and the clamp rod orthogonal to the axis of the clamp rod as being circular, even though the diameter of the grip forming member increases along with the shifting downwards of the clamp rod. Thus a state is attained in which almost no clearance is generated between the scraper and the clamp rod, since it is possible elastically to deform the internal circumferential portion of the scraper in the circumferential direction and in the radial direction.

(4) The gripping assembly may comprise three grip forming members that are disposed at regular intervals around the outer circumferential surface of the clamp rod; straight surfaces may be formed on the intermediate rod section, continuing from the lower end portions of the tapered flat surfaces, and parallel to the axis of the clamp rod; and the horizontal cross section of the lower portion of the tapered section may be formed into a triangular shape having sides that are parallel to the tapered flat surfaces, and whose vertex portions are formed into circular arcs.

Since, according to this constitution, the gripping assembly comprises the three grip forming members that are disposed at regular intervals around the outer circumferential surface of the clamp rod, and straight surfaces are formed on the intermediate rod section, continuing from the lower end portions of the tapered flat surfaces, and parallel to the axis of the clamp rod, accordingly, even in the case of a compact clamping device, it is possible to ensure the strength against pulling of the clamp rod by making the horizontal cross sectional area of the intermediate rod section as large as possible, while still ensuring space for disposing the grip forming members so that they correspond to the straight surfaces.

And moreover, since the horizontal cross section of the lower portion of the tapered section is formed into a triangular shape having sides that are parallel to the tapered flat surfaces, and whose vertex portions are formed into circular arcs, accordingly it is possible to ensure the durability of the scraper, since, when the three grip forming members are engaged, it is possible to form the cross section in the vicinity of the scraper, of the grip forming members and the clamp rod orthogonal to the axis of the clamp rod as being circular.

(5) The gripping assembly may comprise a pair of grip forming members that are disposed to oppose one another on opposite sides of the clamp rod; the horizontal cross section of the intermediate rod section may be formed into a flattened elliptical shape having long sides parallel to the tapered flat surfaces; and the horizontal cross section of the lower portion of the tapered section may be formed into an elliptical shape having long sides parallel to the tapered flat surfaces.

Since, according to this constitution, the gripping assembly comprises the pair of grip forming members that are disposed to oppose one another on opposite sides of the clamp rod, and the horizontal cross section of the intermediate rod section is formed into a flattened elliptical shape having long sides parallel to the tapered flat surfaces, accordingly, even in the case of a compact clamping device, it is possible to ensure the strength against pulling of the clamp rod by making the horizontal cross sectional area of the intermediate rod section as large as possible, while still ensuring space for disposing the pair of grip forming members so that they are on opposite sides of the intermediate rod section.

And moreover, since the horizontal cross section of the lower portion of the tapered section is formed into an elliptical shape having long sides parallel to the tapered flat surfaces, accordingly the radiuses between the edges of the lower portions of these tapered flat surfaces become greater in the upward direction and it is possible to form partial conical surfaces, and it is possible to ensure the durability of the scraper, since it is possible to form the cross section in the vicinity of the scraper of the gripping assembly comprising the grip forming members and the clamp rod orthogonal to the axis of the clamp rod as being circular.

DESCRIPTION OF THE PREFERRED EMBODIMENT

Figure 1:
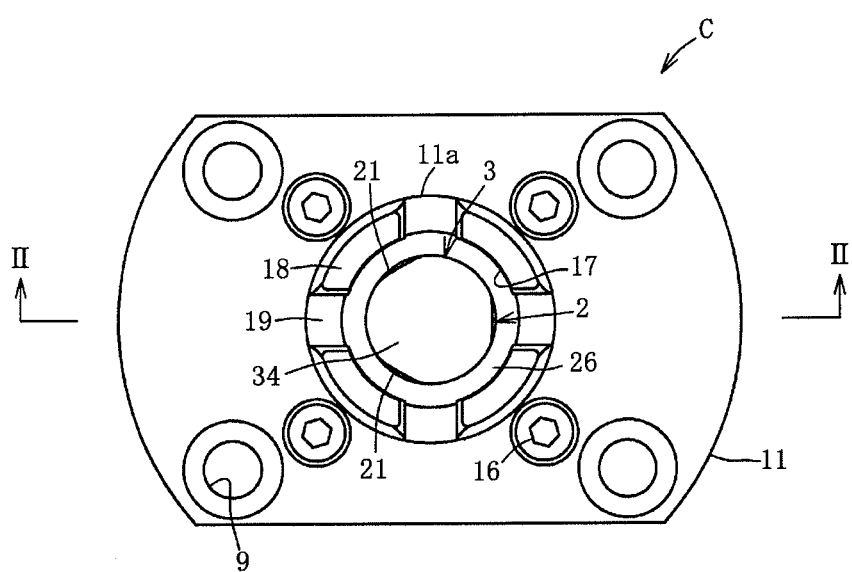
FIG. 1 is a plan view of a clamping device according to Embodiment #1 of the present invention.

In the following, best mode for implementing the present invention will be explained based on embodiments thereof.
Embodiment 1

As shown in FIGS. 1 through 10, this clamping device C comprises a clamp main body 1, a gripping assembly 2 that passes through a through hole 17 in the upper end portion of the clamp main body 1 and extends upwards so as to be able to grip the inner circumferential surface of a hole H in a workpiece W, a clamp rod 3 that is engaged with the gripping assembly 2 and extends in the vertical direction, a drive means 4 that drives the clamp rod 3 to advance or retreat, a support mechanism 5, a scraper 26, and so on. The clamp main body 1 comprises an upper main body portion 11 and a lower main body portion 12, and the clamp main body 1 is attached to a base member 13.

As seen in plan view, the upper main body portion 11 has an almost rectangular shape with both its ends being formed as curved, and this upper main body portion 11 is fixed to the base member 13 by four bolts via four bolt holes 9. The lower main body portion 12 is a tubular member in which a cylindrical aperture 41 is formed, and the upper end portion of the lower main body portion 12 is fitted into a concave portion 15 on the lower surface of the upper main body portion 11, and is fixed to the upper main body portion 11 by four bolts 16. A cylindrical main body barrel portion 11a is provided to project upwards at the central portion of the upper half portion of the clamp main body 1.

The gripping assembly 2 and the clamp rod 3 are provided so as to pass vertically through the through hole 17 in the center portion of the upper end portion of the main body barrel portion 11a. Four seating surfaces 18 are formed as circular arcs on the upper surface of the main body barrel portion 11a so as to surround the gripping assembly 2, and the workpiece W is clamped in the state in which the workpiece W is seated on these seating surfaces 18. Four concave grooves 19 are formed in the shape of a cross on the upper surface of the main body barrel portion 11a, and blown pressurized air flows through these grooves.

Next, the gripping assembly 2 will be explained.

As shown in FIGS. 1 through 7, along with the clamp rod 3, the gripping assembly 2 passes through the through hole 17 in the upper end portion of the clamp main body 1, extends upwards, and is capable of gripping the inner circumferential surface of the hole H in the workpiece W. This gripping assembly 2 comprises three grip forming members 21 made from steel that are provided at regular intervals around the outer periphery of the clamp rod 3. The three grip forming members 21 can be expanded and contracted in the radial direction. Grip claw sections 22 are formed at the upper portions of the grip forming members 21, and base end flange portions 23 shaped as circular arcs are formed at the lower end portions of the grip forming members 21. Straight flat surfaces 24 that are parallel to the axis of the clamp rod 3 are formed on the inner surfaces of the lower half portions of the grip forming members 21.

The length of the grip claw sections 22 in the vertical direction is about ⅓ of the total height of the gripping assembly 2. The cross sections of the grip claw sections 22 orthogonal to the axis of the clamp rod 3 (i.e. horizontal cross sections) are formed into flattened letter D shapes. Tapered surfaces 22a that are progressively offset away from the axis of the clamp rod 3 in the upward direction are formed on the inner surfaces of the grip claw sections 22 and extend from the upper end portions of the grip forming members 21 to intermediate portions therealong, and these tapered surfaces 22a are capable of closely engaging with tapered flat surfaces 35 of a tapered section 34 of the clamp rod 3. Teeth 22b are formed in three steps on the outer circumferential surfaces of the grip claw sections 22, for gripping the inner circumferential surface of the hole H in the workpiece W.

Figure 2:
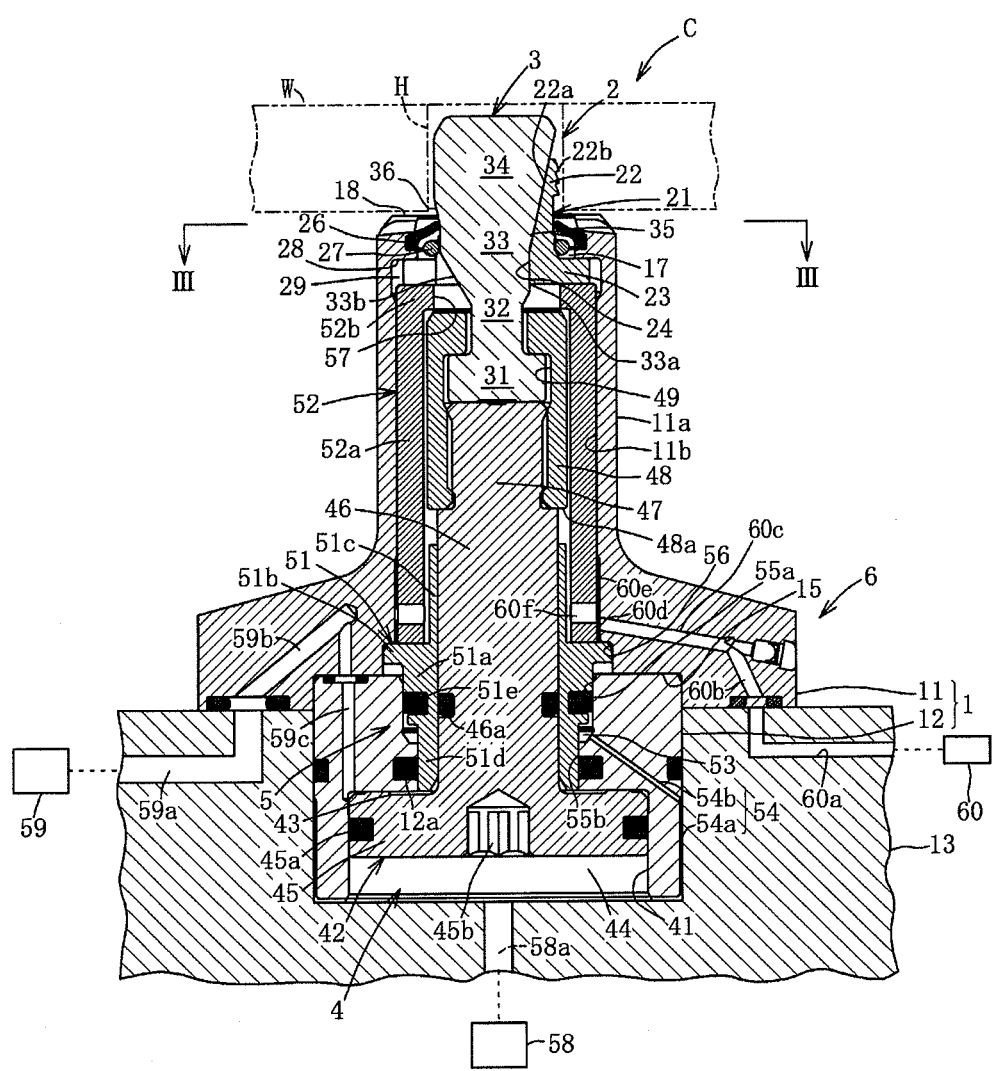
FIG. 2 is a sectional view of the clamping device in its unclamped state.

As shown in FIG. 2, a scraper 26 that blocks the annular clearance within the through hole 17 at the outer peripheral surfaces of the gripping assembly 2 and the clamp rod 3 is installed in the through hole 17 of the upper main body portion 11. The scraper 26 is made from a material that has resilience such as rubber or synthetic resin or the like, and slides or deforms in contact with the gripping assembly 2 and the outer circumferential surface of the clamp rod 3. The scraper 26 is a member that prevents ingress of foreign matter such as swarf or the like from the annular clearance on the outer peripheral surface of the gripping assembly 2 and the clamp rod 3 into the interior of the clamp device C, that makes it more difficult for pressurized air to leak out from within the clamp main body to the exterior, and that holds together the three grip forming members 21 and the clamp rod 3. An O ring 27 is installed on the lower portion of the gripping assembly 2, and biases the three grip forming members 21 inward radial direction so as to reduce the diameter.

The base end flange portions 23 of the gripping assembly 2 are received in a concave circular portion 28 of the main body barrel portion 11a, with a clearance 29 being defined at the outer periphery of the base end flange portions 23. The base end flange portions 23 of the gripping assembly 2 are held between an upper wall portion of the concave circular portion 28 and a flat horizontal portion 52b of a support member 52 so as to be movable in the horizontal direction, and are supported by the support member 52. Along with it being possible for the gripping assembly 2 to be raised and lowered together with the support member 52 and an annular piston member 51 that receives hydraulic pressure, the gripping assembly 2 is installed so as to be shiftable in the horizontal direction orthogonal to the axis of the clamping device C, due to the annular clearance 29 at the external peripheral portion of the concave circular portion 28, and via elastic deformation of the scraper 26.

Next, the clamp rod 3 will be explained.

As shown in FIGS. 1 through 10, the clamp rod 3 extends in the vertical direction so as to pass through the gripping assembly 2, and is engaged with the gripping assembly 2. The clamp rod 3 comprises a T shaped engagement portion 31 at its lower end portion, a small diameter rod section 32 that continues upward from the T shaped engagement portion 31, an intermediate rod section 33 that continues upwards from the small diameter rod section 32, and the tapered section 34 that continues upwards from the intermediate rod section 33 and that is formed at its upper end portion so that its external diameter increases progressively upwards, and that is capable of driving the three grip forming members 21 in the direction (i.e. vertical direction) to increase the external diameter thereof. The horizontal cross section of the small diameter rod section 32 is circular.

Figure 8:
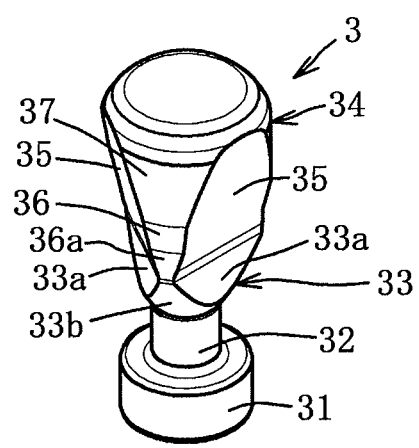
FIG. 8 is a perspective view of the clamp rod.
Figure 9:
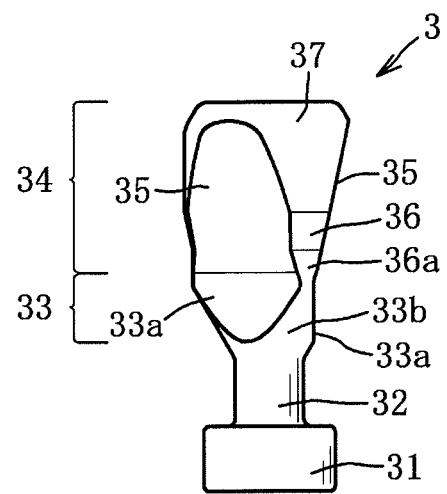
FIG. 9 is an elevation view of the clamp rod.
Figure 10:
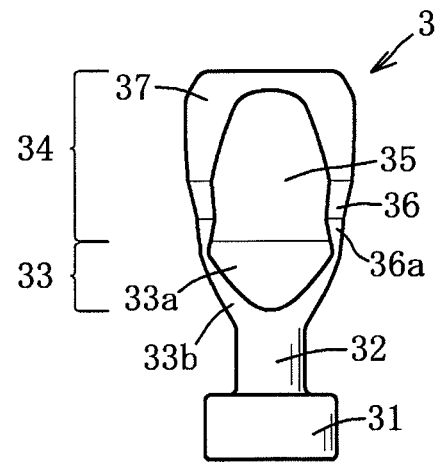
FIG. 10 is a side view of the clamp rod.
Figure 11:
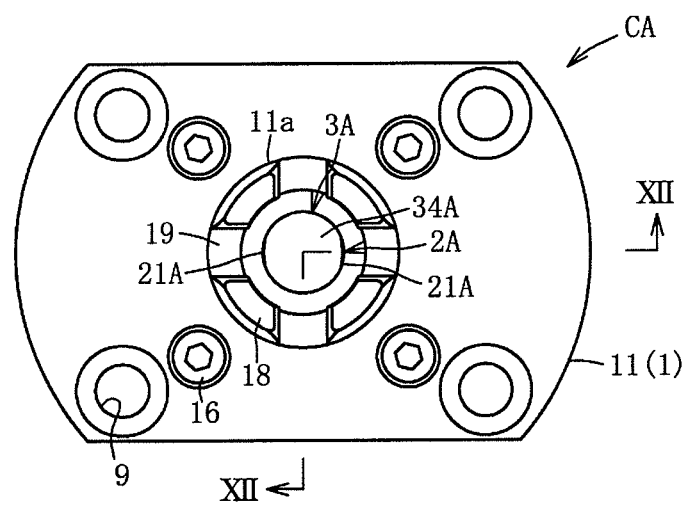
FIG. 11 is a plan view of a clamping device according to Embodiment #2.

As shown in FIGS. 8 through 10, apart from three straight surfaces 33*a* described below, the intermediate rod section 33 is formed in a partial conical shape whose external diameter increases progressively upwards. On this intermediate rod section 33, the three straight surfaces 33*a* are formed at regular intervals around the circumferential direction, and are parallel to the axis of the clamp rod 3. The straight surfaces 33*a* are formed along almost the total length of the intermediate rod section 33, and continue into the lower end portions of the tapered flat surfaces 35 and are parallel to the axis of the clamp rod 3. The straight flat surfaces 24 of the grip forming members 21 are contacted against these straight surfaces 33*a* in a surface contacting manner. With the exception of the straight surfaces 33*a*, the partial conical surfaces 33*b* of the intermediate rod section 33 continue into the lower end portions of partial conical surfaces 36 of the tapered section 34 via partial cylindrical surfaces 36*a* that will be described hereinafter.

The tapered section 34 has the three tapered flat surfaces 35 that contact against the grip claw sections 22 of the three grip forming members 21 in a surface contacting manner, the partial conical surfaces 36 that are formed between the edges of the lower portions of these three tapered flat surfaces 35 and whose radiuses increase progressively upwards, the short partial cylindrical surfaces 36*a* that extend vertically to the lower edges of the partial conical surfaces 36, and partial cylindrical surfaces 37 that continue upwards from the partial conical surfaces 36. It should be understood that it would also be acceptable to arrange to extend the partial conical surfaces 36 through the region of the partial cylindrical surfaces 36*a*, since the partial cylindrical surfaces 36*a* are not an essential feature.

The tapered flat surfaces 35 are formed over almost the entire length of the tapered section 34 in the vertical direction. The horizontal cross section of the lower portion of the tapered section 34 is formed in a triangular shape having sides that are parallel to the tapered flat surfaces 35 and whose vertex portions are formed into circular arcs. In the vicinity of the scraper 26, the partial conical surfaces 36 corresponding to the vertex portions of the triangular cross section of the tapered section 34 can contact against the internal circumferential portion of the scraper 26.

As shown in FIGS. 3 through 7, in the vicinity of the scraper 26 during the clamped state and during the unclamped state, the cross section of the three grip forming members 21 and the clamp rod 3 orthogonal to the axis of the clamp rod 3 is formed as circular. The tilt angles relative to the axis of the clamp rod 3 of the tapered flat surfaces 35 and of the partial conical surfaces 36 are made to be the same (refer to FIG. 2). It should be understood that, during the unclamped state, the lower end portions of the partial conical surfaces 36 of the clamp rod 3 contact against the internal circumferential portion of the scraper 26.

Figure 3:
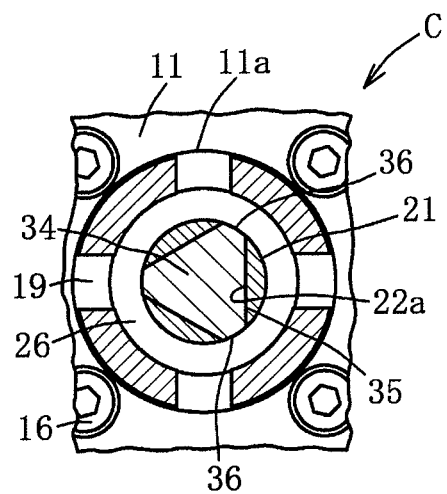
FIG. 3 is a sectional view taken along line of FIG. 2.
Figure 4:
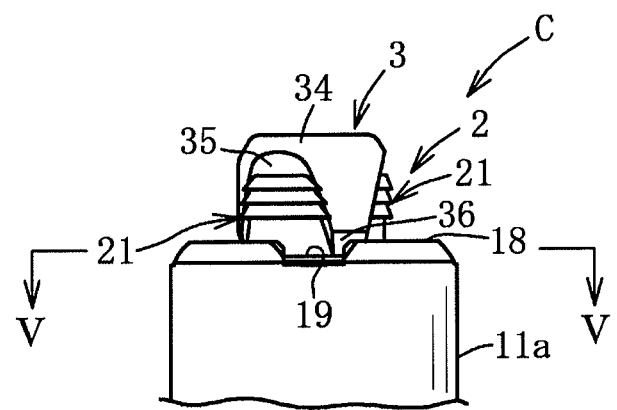
FIG. 4 is an enlarged elevation view of essential portions of the clamping device in a state in which a clamp rod is shifted 1 mm downwards.
Figure 5:
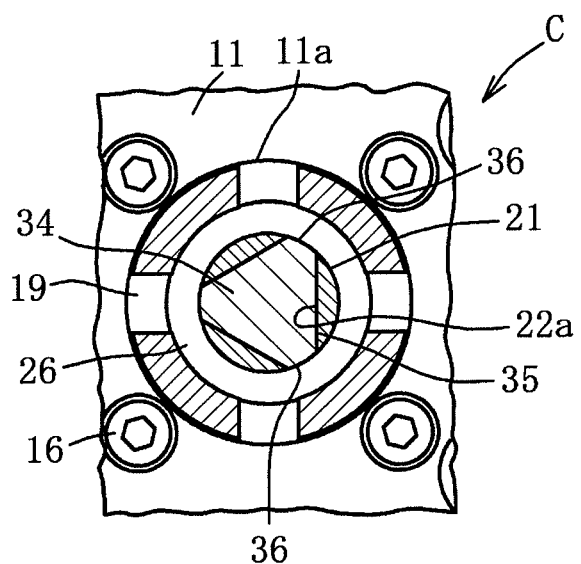
FIG. 5 is a sectional view taken along line V-V of FIG. 4.
Figure 6:
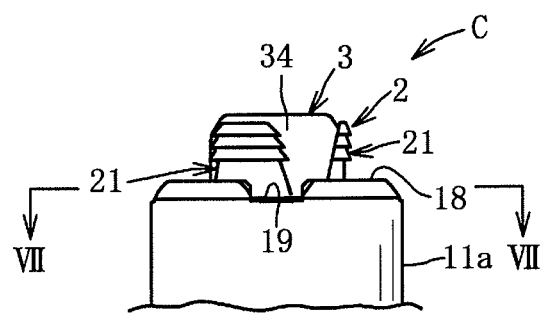
FIG. 6 is an enlarged elevation view of essential portions of the clamping device in a state in which the clamp rod is shifted 3.6 mm downwards.
Figure 7:
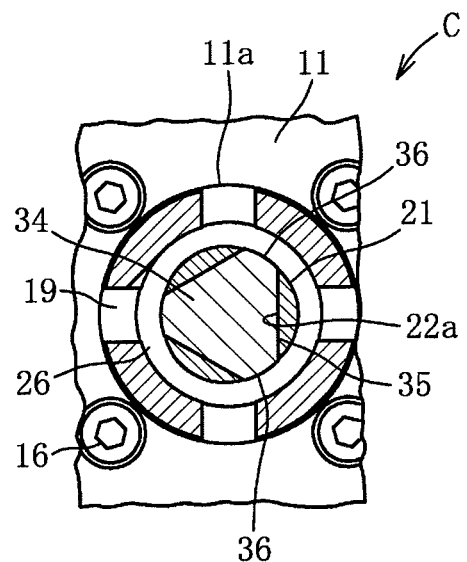
FIG. 7 is a sectional view taken along line VII-VII of FIG. 6.

With the clamping device C, when from the unclamped state of FIGS. 2 and 3 the clamp rod 3 is gradually shifted downwards as shown in FIGS. 4 and FIG. 6 which shows the clamping state, and the gripping assembly 2 is driven so that its diameter is increased, the external diameter of the cylindrical portion consisting of the three grip forming members 21 and the clamp rod 3 is gradually increased, and, as shown in FIGS. 5 and 7, the internal circumferential portion of the scraper 26 is elastically deformed in the circumferential direction and in the radial direction, so that its closely contacting state against the outer circumferential surfaces of the three grip forming members 21 and the clamp rod 3 is maintained.

Next, the drive means 4 will be explained.

As shown in FIGS. 1 and 2, the drive means 4 is constituted with a hydraulic cylinder that drives the clamp rod 3 to advance and retreat with respect to the clamp main body 1 by hydraulic pressure. The drive means 4 comprises a vertically oriented cylindrical hole 41 that is formed in the lower main body portion 12, a piston member 42, a hydraulic chamber 43 for clamping above a piston portion 45 of the piston member 42, a hydraulic chamber 44 for unclamping below the piston portion 45, and so on.

The piston member 42 comprises the piston portion 45 that is installed in the cylindrical hole 41 in an oil-tight manner so as to slide freely, and a rod section 46 that extends upwards from the piston portion 45 into the main body barrel portion 11*a*. The external peripheral portion of the piston portion 45 is sealed in an oil-tight manner by a seal member 45*a*, and the external peripheral portion of the rod section 46 is sealed in an oil-tight manner by a seal member 46*a*. A hexagonal hole 45*b* is formed in the central portion of the lower end portion of the piston portion 45. A screwed shaft portion 47 is formed at the upper end portion of the rod section 46, and a T groove forming member 48, in which a T groove 49 that is shaped as an upside down letter T is formed, is attached to the screwed shaft portion 47 by screw fitting.

A T shaped engagement portion 31 of the clamp rod 3 is engaged from a horizontal direction sidewise into the T groove 49 of the T groove forming member 48. A reception portion 48*a* that is engaged with the upper end of a thin sleeve 51*c* of the annular pressure receiving piston member 51 is defined at the lower end of the T groove forming member 48. Since a slight clearance is present between the T shaped engagement portion 31 and the T groove forming member 48, accordingly it is possible for the clamp rod 3 to shift in the horizontal direction relatively to the T groove forming member 48.

The hydraulic chamber for clamping 43 is defined by the lower main body portion 12, the piston member 42, and the pressure receiving piston member 51. Hydraulic fluid can be supplied from a hydraulic fluid supply source 59 to the hydraulic chamber 43 for clamping via hydraulic passages 59*a* through 59*c*, so as to bias the piston portion 45 in the clamping direction (i.e. downwards). And the hydraulic chamber 44 for unclamping is defined by the lower main body portion 12, the base member 13, and the piston portion 45. Hydraulic fluid can be supplied from a hydraulic fluid supply source 58 to the hydraulic chamber 44 for unclamping via a hydraulic passage 58*a*, so as to bias the piston portion 45 in the unclamping direction.

Next, the support mechanism 5 will be explained.

As shown in FIG. 2, the support mechanism 5 comprises: the annular pressure receiving piston member 51 that is fitted movably over the exterior of the rod section 46 of the piston member 42; the support member 52 that is supported by the base end portion of the pressure receiving piston member 51 and that supports the base end of the gripping assembly 2; a support hydraulic chamber 53 that applies hydraulic pressure to the pressure receiving piston member 51 in the opposite orientation to the clamp direction; and a hydraulic passage 54 that leads from the hydraulic chamber for unclamping 44 of the drive means 4 to the support hydraulic chamber 53. In the support mechanism 5, when the diameter of the gripping assembly 2 is increased so that it grips the inner circumferential surface of the hole H in the workpiece W, the hydraulic force acting on the pressure receiving piston member 51 supports the gripping assembly 2. The hydraulic passage 54 includes an annular hydraulic passage 54a that is formed between the lower main body portion 12 and the base member 13, and a throttle passage 54b that is formed slantingly in the lower main body portion 12.

The pressure receiving piston member 51 comprises: an engaging flange portion 51b that is formed at the upper end portion of an annular piston portion 51a; the thin sleeve 51c that extends upwards for a predetermined length from the internal circumferential portion of the upper end of the annular piston portion 51a; and a small diameter piston portion 51d that extends downwards from the lower end of the annular piston portion 51a and whose lower end portion faces into the hydraulic chamber 43 for clamping. The pressure receiving piston member 51 is fitted over the exterior of the rod section 46 and is fitted into cylindrical holes 55a and 55b of the lower main body portion 12 so as to slide freely therein. The internal circumferential portion of the pressure receiving piston member 51 is sealed in an oil-tight manner by a seal member 46a, and its external circumferential portion is sealed in an oil-tight manner by seal members 12a and 51e.

The engaging flange portion 51b of the pressure receiving piston member 51 is installed into a reception aperture 56 that is defined by the lower main body portion 12 and the upper main body portion 11, so as to be capable of moving upwards and downwards therein. When the pressure receiving piston member 51 is at its lower limit position, its engaging flange portion 51b is received and stopped by the lower end wall of the reception aperture 56; and, when the pressure receiving piston member 51 is at its upper limit position, its engaging flange portion 51b is received and stopped by the upper end wall of the reception aperture 56.

The support member 52 comprises a barrel portion 52a that is fitted into an interior reception aperture 11b of the main body barrel portion 11a over the exteriors of the rod section 46, and the thin sleeve 51c, and a horizontal flat portion 52b at the upper end of this barrel portion 52a. The clamp rod 3 is passed through a circular hole 57 in the horizontal flat portion 52b. This circular hole 57 has a size such that the clamp rod 3 can pass through it. The horizontal flat portion 52b at the upper end of the support member 52 contacts against and supports the lower surfaces of the base end flange portions 23 of the gripping assembly 2, and the lower end of the barrel portion 52a contacts against and is supported by the upper end of the annular piston portion 51a of the pressure receiving piston member 51, so that the support member 52 is raised and lowered integrally with the pressure receiving piston member 51.

Next, the pressurized air introduction means 6 will be explained.

As shown in FIG. 2, the pressurized air introduction means 6 is a device that injects pressurized air into the portions within the clamp main body 1 that are higher up than the pressure receiving piston member 51, so that air is blown against the gripping assembly 2, the clamp rod 3, and the seating surface 18. The pressurized air introduction means 6 comprises an air passage 60a that is formed in the base member 13 and is connected to a pressurized air supply source 60, and a plurality of air passages 60b and 60c and an air ejection hole 60d that are formed in the upper main body portion 11. It should be understood that the right end portion of the air passage 60c is closed by a plug.

An annular clearance 60e is defined between the upper main body portion 11 and the support member 52, and a small hole 60f is formed in the vicinity of the lower end of the barrel portion 52a of the support member 52. The pressurized air from the pressurized air supply source 60 is supplied via the air passages 60a through 60c and the air ejection hole 60d to the annular clearance 60e and the small hole 60f, and flows upwards through the clearances on the outer peripheral side and the internal peripheral side of the support member 52, so that air is blown against the gripping assembly 2, the clamp rod 3, and the seating surfaces 18. This pressurized air is supplied both in the clamped state and in the unclamped state. During the unclamped state, air is blown against the seating surfaces 18 through the slight clearance between the gripping assembly 2 and the clamp rod 3, and the scraper 26.

Next, the operation of the clamping device C will be explained.

When the workpiece W is to be clamped by the clamping device C, initially, the hydraulic pressure in the hydraulic chamber 43 for clamping is brought to drain pressure, and hydraulic pressure is supplied to the hydraulic chamber 44 for unclamping and to the support hydraulic chamber 53.

When this is done, the clamp rod 3, the gripping assembly 2, the piston member 42, and the pressure receiving piston member 51 are raised as shown in FIGS. 2 and 3, and reach their upper limit positions. At this time, the gripping assembly 2 is held in its contracted state by the scraper 26 and the O ring 27, and, in the vicinity of the scraper 26, a cylindrical external shape is defined by the three grip forming members 21 and the partial conical surfaces 36 of the clamp rod 3. In other words, in the neighborhood of the scraper 26, the cross section of the clamp rod 3 and the three grip forming members 21 orthogonal to the axis of the clamp rod 3 becomes circular. Since, due to this, almost no clearance is present between the gripping assembly 2 and the clamp rod 3 and the scraper 26, accordingly the amount of leakage of pressurized air to the exterior becomes extremely small, and, as compared to a clamping device of the same general type according to the prior art, the consumption of pressurized air becomes extremely small.

Next, the workpiece W is approached, the gripping assembly 2 and the clamp rod 3 are inserted into the hole H in the workpiece W, and the workpiece W is supported on the seating surfaces 18. Next, the hydraulic pressure in the hydraulic chamber 44 for unclamping is brought to drain pressure, and hydraulic pressure is supplied to the hydraulic chamber 43 for clamping, so that hydraulic pressure acts on the piston member 42 in the downwards direction. When this is done, since the reduction of hydraulic pressure in the support hydraulic chamber 53 is delayed due to the throttling hydraulic passage 54b, accordingly the pressure receiving piston member 51 receives the hydraulic pressure in the support hydraulic chamber 53 and is held at its upper limit position, and the gripping assembly 2 is also held at its upper limit position, but, since the piston member 42 is driven downwards by the hydraulic pressure in the downwards direction, accordingly the clamp rod 3 is shifted relatively downwards with respect to the gripping assembly 2.

As a result, the three grip claw sections 22 of the gripping assembly 2 are driven by the three tapered flat surfaces 35 of the tapered section 34 of the clamp rod 3 so that their diameter increases, and they are brought into the state where they grip the inner circumferential surface of the hole H in the workpiece W, while the gripping assembly 2 and the clamp rod 3 are brought to be in the state of being shifted downward relatively to the workpiece W. From this state, the piston member 42, the gripping assembly 2, the clamp rod 3, and the pressure receiving piston member 51 are driven downwards all together by just a small distance (for example 0.2 to 0.5 mm), so that the workpiece W is strongly pulled against the seating surfaces 18 and is held in the clamped state.

At this time, in the vicinity of the scraper 26, since the partial conical surfaces 36 are also shifted downwards along with the shifting downwards of the tapered section 34, throughout the unclamping state to the clamping state accordingly the external diameter of the circular horizontal cross section defined by the grip forming members 21 and the partial conical surfaces 36 becomes gradually larger, and, as shown in FIGS. 3, 5, and 7, the internal circumferential portion of the scraper 26 is elastically deformed in the circumferential direction and in the radial direction, so that the state is established in which almost no clearance is present between the scraper 26, the gripping assembly 2, and the clamp rod 3.

Next, the advantages of the clamping device C will be explained.

Since, in the vicinity of the scraper 26, the cross section of the three grip forming members 21 and the clamp rod 3 orthogonal to the axis of the clamp rod 3 is shaped as a circle, and since, when the clamp rod 3 is driven downwards, the external diameter of the circular cross section of the grip forming members 21 and the clamp rod 3 is increased, and the internal circumferential portion of the scraper 26 is elastically deformed in the circumferential direction and in the radial direction, accordingly the state is established in which no clearance is present between the scraper 26 and the gripping assembly 2 and the clamp rod 3. Therefore it is possible to prevent ingress of foreign matter into the clamp main body 1, and the amount of consumption of pressurized air can be made extremely low even though air blowing is continued in the clamped state, so that there is a saving of energy. It should be understood that, according to requirements, it would also be acceptable to arrange to omit the blowing of air in the clamped state.

Since, in the vicinity of the scraper 26, the edges of the three grip forming members 21 do not project further outwards than the outer surface of the clamp rod 3, accordingly the scraper 26 does not suffer damage due to the edges of the three grip forming members 21, so that it is possible to ensure the durability of the scraper 26.

Since during the unclamped state the lower end portions of the partial conical surfaces 36 of the clamp rod 3 contact against the scraper 26, accordingly, from just after the start of shifting of the clamp rod 3 downwards and during the driving for clamping, it is possible for the internal circumferential portion of the scraper 26 to be elastically deformed by the partial conical surfaces 36 of the tapered section 34, so that the state is established in which almost no clearance is present between the scraper 26 and the gripping assembly 2 and the clamp rod 3.

Since the cross sections of the grip claw sections 22 of the grip forming members 21 orthogonal to the axis of the clamp rod 3 are formed in flattened letter D shapes, accordingly, by engaging the grip forming members 21 to the tapered flat surfaces 35 of the clamp rod 3, it is possible to form the cross section of the clamp rod 3 and the gripping assembly 2 orthogonal to the axis of the clamp rod 3 as circular.

And, since the tilt angles of the tapered flat surfaces 35 and of the partial conical surfaces 36 with respect to the axis of the clamp rod 3 are formed to be the same, accordingly it is possible still to maintain the cross section of the grip forming members 21 and the clamp rod 3 orthogonal to the axis of the clamp rod 3 as being circular, even when the diameter of the grip forming members 21 increases along with shifting of the clamp rod 3 downwards. Accordingly almost no clearance appears between the scraper 26 and the gripping assembly 2 and the clamp rod 3, since it is possible for the internal circumferential portion of the scraper 26 to be deformed elastically.

Since the gripping assembly 2 comprises the three grip forming members 21 that are arranged at regular intervals on the outside of the clamp rod 3 around its circumferential direction, and since the parallel straight surfaces 33a are formed on the intermediate rod section 33 that extend to the lower edge portions of the tapered flat surfaces 35 and that are parallel to the axis of the clamp rod 3, accordingly it is possible, even with this compact clamping device C, to make the horizontal cross sectional area of the rod section 33 as large as possible while still ensuring sufficient space for disposing the grip forming members 21 so that they correspond to the straight surfaces 33a, and therefore it is possible to ensure the strength of the clamp rod 3 against pulling.

Since the horizontal cross section of the lower portion of the tapered section 34 is formed in a triangular shape that has sides parallel to the tapered flat surfaces 35 and has vertex portions that formed into circular arcs, and since, in the state in which it is engaged with the three grip forming members 21, in the vicinity of the scraper 26, it is possible for the cross section of the grip forming members 21 and the clamp rod 3 orthogonal to the axis of the clamp rod 3 to be formed as a circle, accordingly it is possible to ensure the durability of the scraper 26.

While, in the following embodiments, various examples in which the clamping device C is partially varied and various examples in which these examples are partially varied will be explained, similar reference numerals will be appended to elements similar to those of Embodiment #1, and explanation thereof will be omitted, with only those structural elements that are different being explained.

Embodiment 2

While, as shown in FIGS. 11 through 17, this clamping device CA has a clamp main body 1, a gripping assembly 2A, a clamp rod 3A, and a drive means that drives the clamp rod 3A forwards and backwards and so on, only the gripping assembly 2A and the clamp rod 3A will be explained herein, since this clamping device CA is the same as that of Embodiment #1, apart from the fact that the gripping assembly 2A and the clamp rod 3A are changed.

First, the gripping assembly 2A will be explained.

As shown in FIGS. 12 through 17, the gripping assembly 2A comprises a pair of grip forming members 21A made from steel, these being provided in an opposing manner on both sides of the clamp rod 3A. The pair of grip forming members 2A can be expanded and contracted in the radial direction. Grip claw sections 22A are formed at the upper portions of the grip forming members 21A, and semicircular arcuate horizontal base end flange portions 23A are formed at the lower end portions of the grip forming members 21A. Moreover, straight flat surfaces 24A are formed on the inner surfaces of the lower half portions of the grip forming members 21A.

The length of the grip claw sections 22A in the vertical direction is about ⅓ of the total height of the gripping assembly 2A. The cross sections of the grip claw sections 22A orthogonal to the axis of the clamp rod 3A (i.e. their horizontal cross sections) are formed into flattened D shapes. Tapered surfaces 22aA that are progressively offset away from the axis of the clamp rod 3A in the upward direction are formed on the inner surfaces of the grip claw sections 22A, and these tapered surfaces 22aA are adapted to engage closely with a pair of tapered flat surfaces 35A of a tapered section 34A of the clamp rod 3A.

Next, the clamp rod 3A will be explained.

As shown in FIGS. 12 through 17, the clamp rod 3A is engaged with the gripping assembly 2A and extends in the vertical direction. The clamp rod 3A comprises a T shaped engagement portion at its lower end portion, a small diameter rod section 32 that continues upward from this T shaped engagement portion, an intermediate rod section 33A that continues upwards from this small diameter rod section 32, and a tapered section 34A that continues upwards from this intermediate rod section 33A and that is formed at its upper end portion so that its external diameter increases progressively upwards, and that moreover is capable of driving the pair of grip forming members 21A in the direction to increase the external diameter thereof.

The intermediate rod section 33A is formed into a rod shape whose external diameter is greater than that of the small diameter rod section 32, and a pair of straight surfaces 33aA that are parallel to the axis of the clamp rod 3A are formed on its sides so as to oppose one another. The straight surfaces 33aA continue into lower end portions of tapered flat surfaces 35A, and are formed to be parallel to the axis of the clamp rod 3A. The straight flat surfaces 24A of the grip forming members 21A are contacted against these straight surfaces 33aA in a surface contacting manner.

The tapered section 34A has the pair of tapered flat surfaces 35A that are contacted against the grip claw sections 22A of the pair of grip forming members 21A and whose offset distance increases progressively upwards, the partial conical surfaces 36A that are formed between the edges of the lower half portions of these tapered flat surfaces 35A and whose radiuses increase progressively upwards, and partial cylindrical surfaces 37A that continue upwards above these partial conical surfaces 36A. The tapered flat surfaces 35A are formed over almost the entire length of the tapered section 34A in the vertical direction. The horizontal cross section of the lower half portion of the tapered section 34A is formed into an elliptical shape that has long sides that are parallel to the tapered flat surfaces 35A. The partial conical surfaces 36A that correspond to both end portions of the cross sectional elliptical shape in the longitudinal direction are contacted against the internal circumferential portion of the scraper 26.

As shown in FIGS. 12 through 17, in the vicinity of the scraper 26, the cross section of the pair of grip forming members 21A and the clamp rod 3A orthogonal to the axis of the clamp rod 3A is formed as circular. The tilt angles relative to the axis of the clamp rod 3A of the tapered flat surfaces 35A and the partial conical surfaces 36A are made to be the same (refer to FIG. 12). During the unclamped state, the lower end portions of the partial conical surfaces 36A of the clamp rod 3A contact against the internal circumferential portion of the scraper 26.

Figure 12:
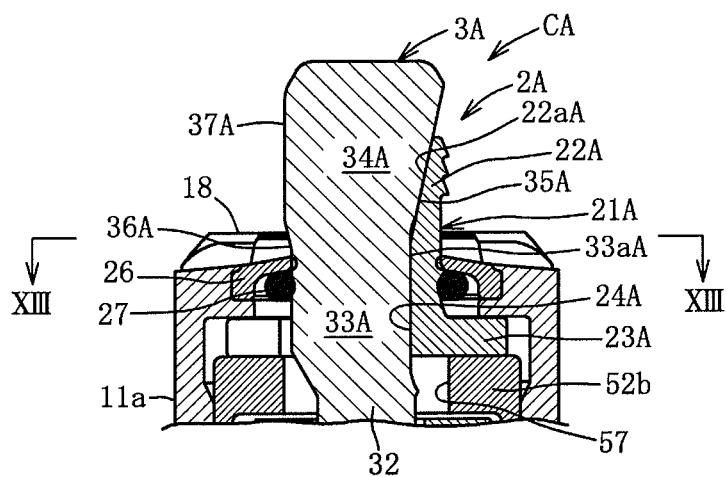
FIG. 12 is an enlarged sectional view of essential portions of the clamping device in the unclamped state.
Figure 13:
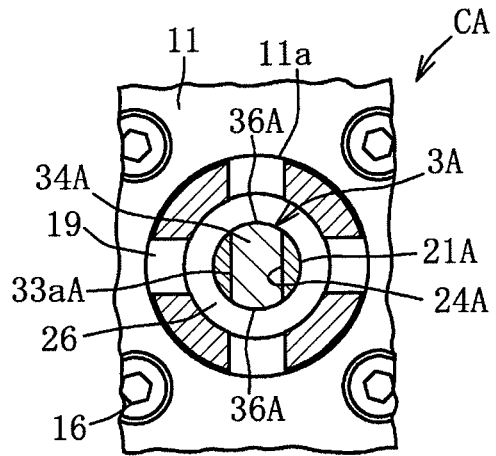
FIG. 13 is a sectional view taken along line XIII-XIII of FIG. 12.
Figure 14:
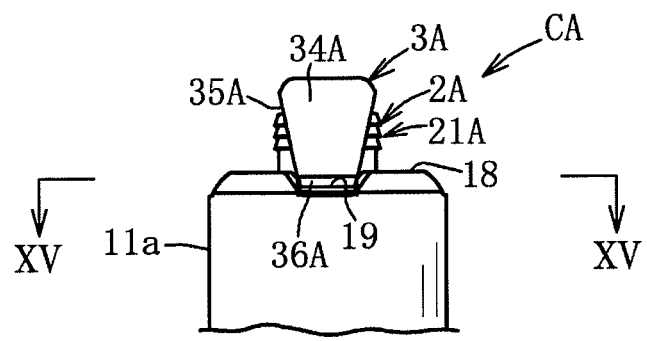
FIG. 14 is an enlarged elevation view of essential portions of the clamping device in a state in which a clamp rod is shifted 1 mm downwards.
Figure 15:
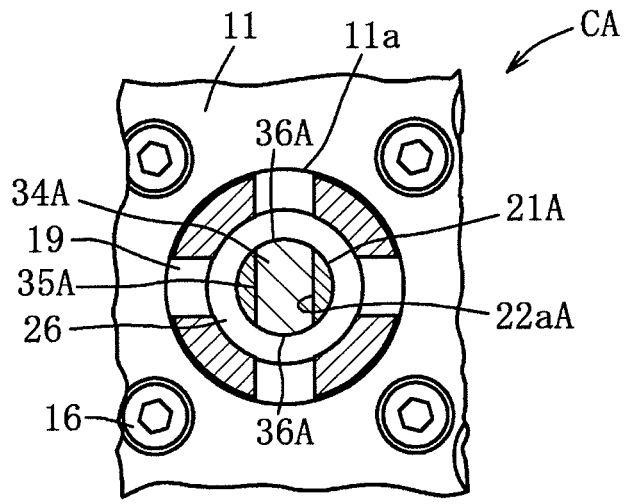
FIG. 15 is a sectional view taken along line XV-XV of FIG. 14.
Figure 16:
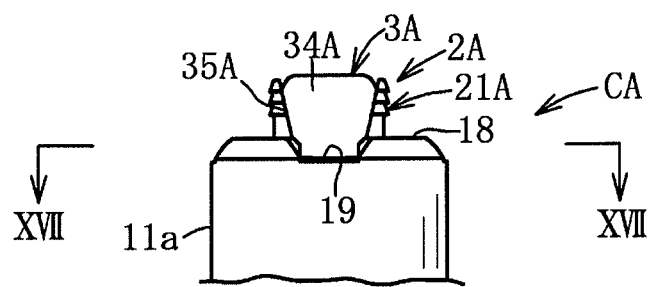
FIG. 16 is an enlarged elevation view of essential portions of the clamping device in a state in which the clamp rod is shifted 3.6 mm downwards.
Figure 17:
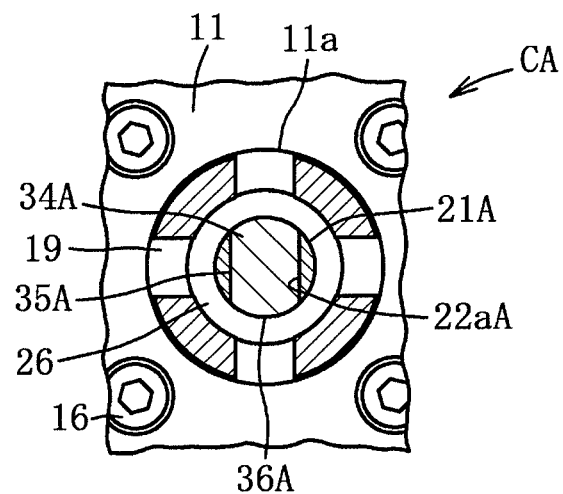
FIG. 17 is a sectional view taken along line XVII-XVII of FIG. 16.
Figure 18:
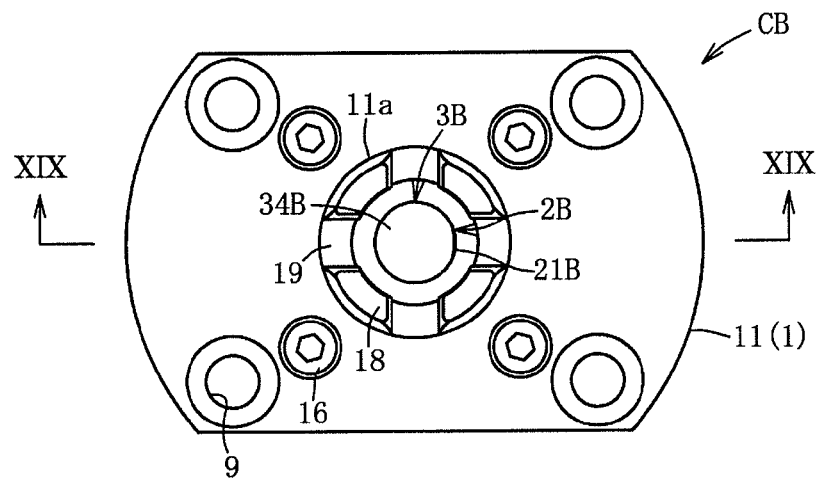
FIG. 18 is a plan view of a clamping device according to Embodiment #3.

With the clamping device CA, when from the unclamped state of FIGS. 12 and 13 the clamp rod 3A is gradually shifted downwards as shown in FIGS. 14 and 16 and the gripping assembly 2A is driven so that its diameter is increased, the external diameter of the circular cross section of the pair of grip forming members 21A and the clamp rod 3A is gradually increased in the radial direction, and, as shown in FIGS. 15 and 17, the internal circumferential portion of the scraper 26 is elastically deformed in the circumferential direction and in the radial direction. Since the other structures, the operation, and the advantages are almost the same as those of Embodiment #1, accordingly explanation thereof will be omitted.

Embodiment 3

While, as shown in FIGS. 18 through 24, this clamping device CB has a clamp main body 1, a gripping assembly 2B, a clamp rod 3B, and a drive means that drives this clamp rod 3B to advance and retract and so on, in this embodiment only the gripping assembly 2B and the clamp rod 3B will be explained, since this clamping device CB is the same as that of Embodiment #1, apart from the fact that the gripping assembly 2B and the clamp rod 3B are changed.

First, the gripping assembly 2B will be explained.

As shown in FIGS. 19 through 24, the gripping assembly 2B comprises a single grip forming member 21B made from steel, this being provided on the outer circumference of the clamp rod 3B. The single grip forming member 2B can be expanded and contracted in the radial direction. A grip claw section 22B is formed at the upper portion of the grip forming member 21B, and a semicircular arcuate horizontal base end flange portion 23B is formed at the lower end portion of the grip forming member 21B. Moreover, a straight flat surface 24B is formed on the inner surface of the lower half portion of the grip forming member 21B.

The length of the grip claw section 22B in the vertical direction is about ⅓ of the total height of the gripping assembly 2B. The cross section of the grip claw section 22B orthogonal to the axis of the clamp rod 3B (i.e. its horizontal cross section) is formed as a flattened letter D shape. A tapered surface 22aB that is progressively offset away from the axis of the clamp rod 3B in the upward direction is formed on the inner surface of the grip claw section 22B, and this tapered surface 22aB is adapted to engage closely with a single tapered flat surface 35B of a tapered section 34B of the clamp rod 3B.

Next, the clamp rod 3B will be explained.

As shown in FIGS. 19 through 24, the clamp rod 3B is engaged with the grip forming member 21B and extends in the vertical direction. The clamp rod 3B comprises a T shaped engagement portion at its lower end portion, a small diameter rod section 32 that continues upward from this T shaped engagement portion, an intermediate rod section 33B that continues upwards from the small diameter rod section 32, and a tapered section 34B that continues upwards from the intermediate rod section 33B and that is formed at its upper end portion so that its external diameter increases progressively upwards, and that is capable of driving the single grip forming member 21B in the direction to increase the external diameter thereof.

The intermediate rod section 33B is formed into a rod shape whose external diameter is greater than that of the small diameter rod section 32, and a single straight surface 33aB that is parallel to the axis of the clamp rod 3B is formed on its side surface. The straight surface 33aB continues into the lower end portion of a tapered flat surface 35B, and is formed to be parallel to the axis of the clamp rod 3B. The straight flat surface 24B of the grip forming member 21B is contacted against the straight surface 33aB in a surface contacting manner.

The tapered section 34B has the single tapered flat surface 35B that contacts against the grip claw section 22B of the single grip forming member 21B and whose offset distance increases progressively upwards, a partial conical surface 36B that is formed between the edges of the lower half portion of the tapered flat surface 35B and whose radius increases progressively upwards, and a partial cylindrical surface 37B that continues upwards above the partial conical surface 36B. The tapered flat surface 35B is formed over almost the entire length of the tapered section 34B in the vertical direction. The horizontal cross section of the lower half portion of the tapered section 34B is formed into a letter D shape that has sides that are parallel to the tapered flat surface 35B. The partial conical surface 36B that corresponds to the curved portion of the cross sectional D shape is contacted against the internal circumferential portion of the scraper 26.

As shown in FIGS. 19 through 24, in the vicinity of the scraper 26, the cross section of the single grip forming member 21B and the clamp rod 3B orthogonal to the axis of the clamp rod 3B is formed as circular. The tilt angles relative to the axis of the clamp rod 3B of the tapered flat surface 35B and the partial conical surface 36B are made to be the same (refer to FIG. 19). It should be understood that, during the unclamped state, the lower end portion of the partial conical surface 36B of the clamp rod 3B contacts against the internal circumferential portion of the scraper 26.

Figure 19:
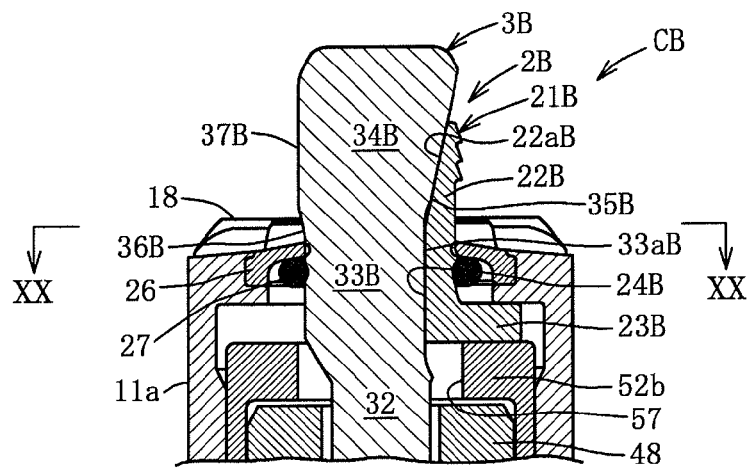
FIG. 19 is an enlarged elevation view of essential portions of the clamping device in the unclamped state.
Figure 20:
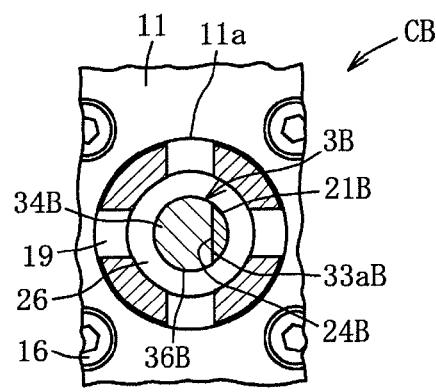
FIG. 20 is a sectional view taken along line XX-XX of FIG. 19.
Figure 21:
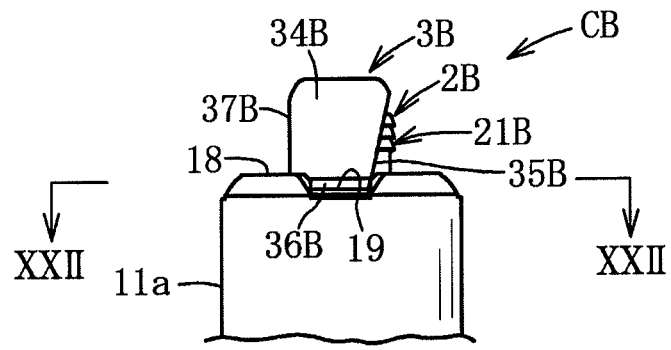
FIG. 21 is an enlarged elevation view of essential portions of the clamping device in a state in which a clamp rod is shifted 1 mm downwards.
Figure 22:
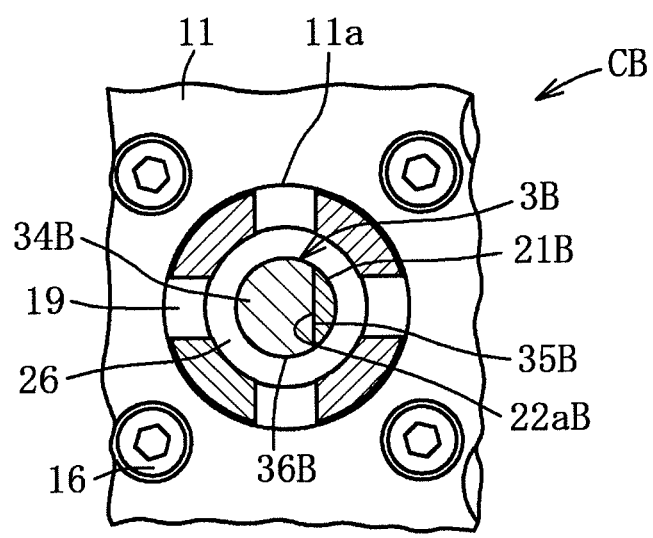
FIG. 22 is a sectional view taken along line XXII-XXII of FIG. 21.
Figure 23:
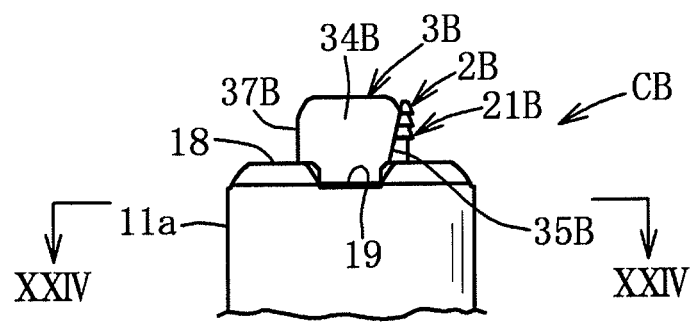
FIG. 23 is an enlarged elevation view of essential portions of the clamping device in a state in which the clamp rod is shifted 3.6 mm downwards.
Figure 24:
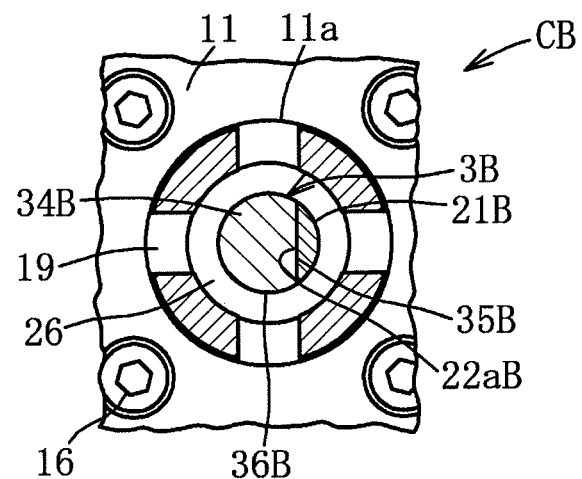
FIG. 24 is a sectional view taken along line XXIV-XXIV of FIG. 23.
Figure 25:
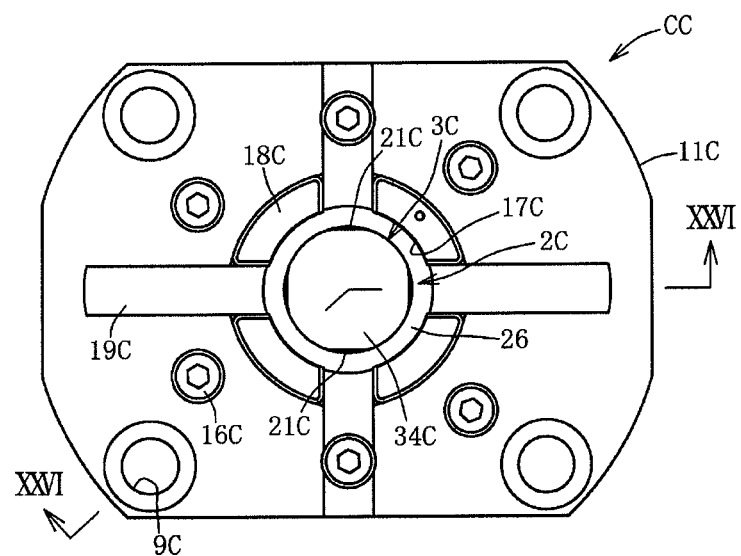
FIG. 25 is a plan view of a clamping device according to Embodiment #4.

With the clamping device CB, when from the unclamped state of FIGS. 19 and 20 the clamp rod 3B is gradually shifted downwards as shown in FIGS. 21 and 23, and the gripping assembly 2B is driven so that its diameter is increased, the external diameter of the circular cross section of the single grip forming member 21B and the clamp rod 3B is gradually increased in the radial direction, and, as shown in FIGS. 22 and 24, the internal circumferential portion of the scraper 26 is gradually stretched in the circumferential direction, so that it is elastically deformed. Since the other structure, the operation, and the advantages are almost the same as those of Embodiment #1, explanation thereof will be omitted.

Embodiment 4

As shown in FIGS. 25 through 31, this clamping device CC has a clamp main body 10, a gripping assembly 20, a clamp rod 3C, a drive means 4C that drives the clamp rod 3C to advance and retract, and so on. The clamp main body 10 comprises an upper main body portion 11C and a lower main body portion 12C, and the clamp main body 1C is attached to a base member 13C.

As seen in plan view, the upper main body portion 11C is formed almost as a rectangle with its corner portions at both of its ends being formed in curved shapes, and this upper main body portion 11C is fixed to the base member 13C by four bolts that are inserted into four bolt holes 90. And the lower main body portion 12C is a tubular member in which a cylindrical hole 61 is formed, with the upper end portion of the lower main body portion 12C being fitted into a concave portion 15C on the lower surface portion of the upper body portion 11C, and with the lower main body portion being fixed to the upper main body portion 11C by six bolts 16C.

The gripping assembly 2C and the clamp rod 3C are disposed so as to pass through a vertical through hole 17C in the center portion of the upper main body portion 110. Four seating surfaces 18C shaped as circular arcs are formed on the upper surface of the upper main body portion 11C and surround the gripping assembly 2C, and a workpiece W is clamped in the state in which the workpiece W is seated on these seating surfaces 18C. Four concave grooves 19C are formed in the shape of a cross on the upper surface of the upper main body portion 11C, and pressurized air is blown into these grooves and flows through them.

Next, the gripping assembly 2C will be explained.

As shown in FIGS. 26 through 31, along with the clamp rod 3C, the gripping assembly 2 passes through the through hole 17C in the upper end portion of the clamp main body 10, extends upwards, and is capable of gripping the inner circumferential surface of the hole H in the workpiece W. This gripping assembly 2C comprises four grip forming members 21C that are provided at regular intervals around the outer periphery of the clamp rod 3C. The four grip forming members 21C can be expanded and shrunk in the radial direction. Grip claw sections 22C are formed at the upper portions of the grip forming members 21C, and horizontal base end flange portions 23C shaped as circular arcs are formed at the lower end portions of the grip forming members 21C. Straight flat surfaces 24C are formed on the inner surfaces of the lower half portions of the four grip forming members 21C.

The length of the grip claw sections 22C in the vertical direction is about ⅓ of the total height of the gripping assembly 2C. The cross sections of the grip claw sections 22C orthogonal to the axis of the clamp rod 3C (i.e. their horizontal cross sections) are formed into flattened letter D shapes. Tapered surfaces 22aC that are progressively offset away from the axis of the clamp rod 3C in the upward direction are formed on the inner surfaces of the grip claw sections 22C and extend from the upper end portions of the grip forming members 21C to intermediate portions therealong, and these tapered surfaces 22aC are adapted to be closely engaged with tapered flat surfaces 35C of a tapered section 34C of the clamp rod 3C. Teeth are formed in three steps on the outer circumferential surfaces of the grip claw sections 22C, for easily gripping the inner circumferential surface of the hole in the workpiece W.

Figure 26:
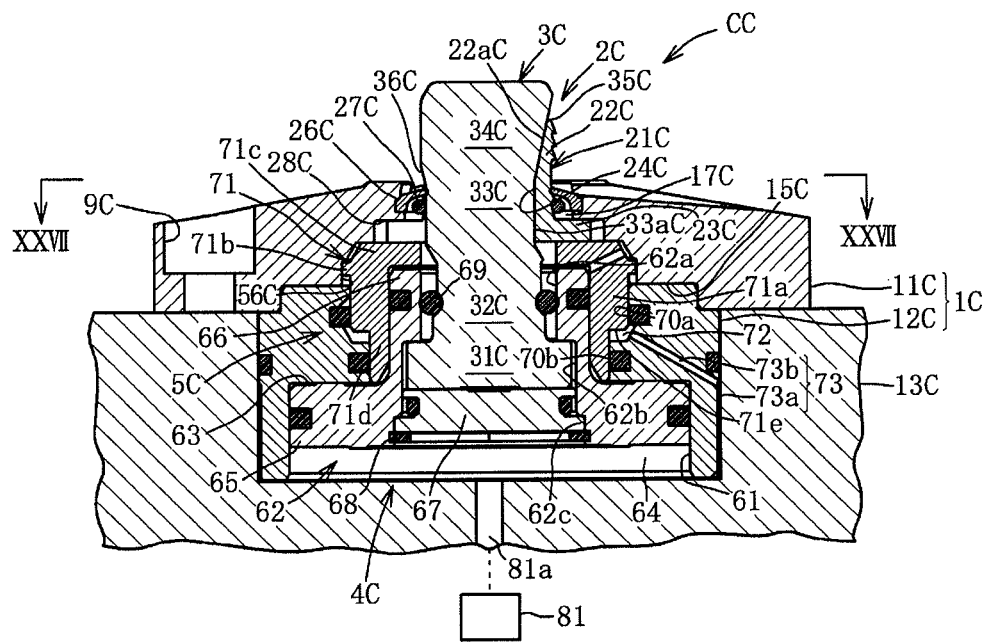
FIG. 26 is an enlarged elevation view of essential portions of the clamping device in the unclamped state.

As shown in FIG. 26, a scraper 26C that blocks the annular clearance at the outer peripheral surfaces of the gripping assembly 2C and the clamp rod 3C is installed in the through hole 17C of the upper main body portion 11C. The scraper 26C is a member that holds together the four grip forming members 21C and the clamp rod 3C. An O ring 27C is installed on the lower portion of the gripping assembly 2C, and biases the four grip forming members 21C in the inward radial direction.

The base end flange portions 23C of the gripping assembly 2C are received in a concave circular portion 28C of the upper main body portion 11C, with a clearance being defined at the outer periphery of the base end flange portions 23C. The base end flange portions 23C of the gripping assembly 2C are held between an upper wall portion of the concave circular portion 28C and a flat horizontal portion 71c of an annular pressure receiving member 71 of a support mechanism 5C so as to be movable in the horizontal direction, and are supported by the annular pressure receiving member 71. Along with it being possible for the gripping assembly 2C to be raised and lowered integrally together with the annular pressure receiving member 71, the gripping assembly 2C is installed so as to be shiftable in the horizontal direction orthogonal to the axis of the clamping device CC, due to the annular clearance at the external peripheral portion of the concave circular portion 28C, and via elastic deformation of the scraper 26C.

Next, the clamp rod 3C will be explained.

As shown in FIGS. 26 through 31, the clamp rod 3C extends in the vertical direction so as to engage with the gripping assembly 2C. The clamp rod 3C comprises a large diameter flange portion 31C at its lower end portion, a large diameter rod section 32C that continues upward from the large diameter flange portion 310, a large diameter rod section 32C extending upwards from the large diameter flange portion 31C, an intermediate rod section 33C that continues upwards from the large diameter rod section 32C, and a tapered section 34C that continues upwards from the intermediate rod section 33C and that is formed at its upper end portion so that its external diameter increases progressively upwards, and that is capable of driving the four grip forming members 21C in the direction to increase the external diameter thereof. The horizontal cross section of the large diameter rod section 32C is circular.

The intermediate rod section 33C is formed to have a diameter that is slightly larger than that of the large diameter rod section 32C. On this intermediate rod section 33C, four straight surfaces 33aC are formed at regular intervals around the circumferential direction, and are parallel to the axis of the clamp rod 3C. The straight surfaces 33aC are formed along almost the total length of the intermediate rod section 33C in the vertical direction. The straight surfaces 33aC continue into the lower end portions of the tapered flat surfaces 35C, and are parallel to the axis of the clamp rod 3C. The straight flat surfaces 24C of the grip forming members 21C are contacted against the straight surfaces 33aC in a surface contacting manner. The corner portions of the intermediate rod section 33C, with the exception of the straight surfaces 33aC, continue into the lower end portions of the partial conical surfaces 36C of the tapered section 34C.

The tapered section 34C has the four tapered flat surfaces 35O that are contacted against the grip claw sections 22C of the four grip forming members 21C in a surface contacting manner, the partial conical surfaces 36C that are formed between the edges of the lower portions of these three tapered flat surfaces 35C and whose radiuses increase progressively upwards, and partial cylindrical surfaces 37C that continue upwards from the partial conical surfaces 36C. The tapered flat surfaces 35C extend over almost the total length of the tapered section 34C in the vertical direction. The horizontal cross section of the lower portion of the tapered section 34C is formed in the shape of a quadrilateral having sides that are parallel to the tapered flat surfaces 35C and whose vertex portions are formed as circular arcs. In the vicinity of a scraper 26C, the partial conical surfaces 36C that correspond to the vertex portions of the quadrilateral cross sectional shape of the tapered section 34C are contacted against the internal circumferential portion of the scraper 26C.

As shown in FIGS. 26 through 31, in the vicinity of the scraper 26C, the cross section of the four grip forming members 21C and the clamp rod 3C orthogonal to the axis of the clamp rod 3 is formed as circular. The tilt angles relative to the axis of the clamp rod 3 of the tapered flat surfaces 35C and of the partial conical surfaces 36C are made to be the same (refer to FIG. 26). It should be understood that, during the unclamped state, the lower end portions of the partial conical surfaces 36C of the clamp rod 3C contact against the internal circumferential portion of the scraper 26C.

Figure 27:
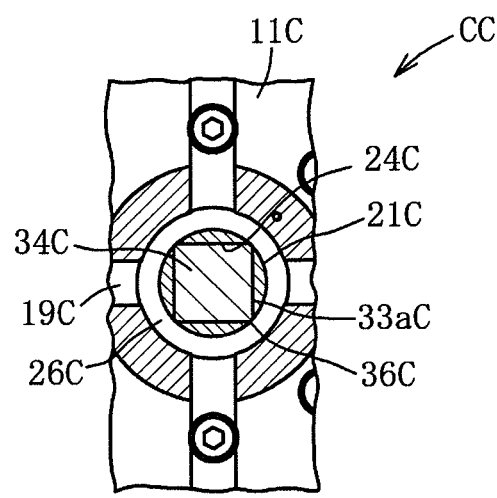
FIG. 27 is a sectional view taken along line XXVII-XXVII of FIG. 26.
Figure 28:
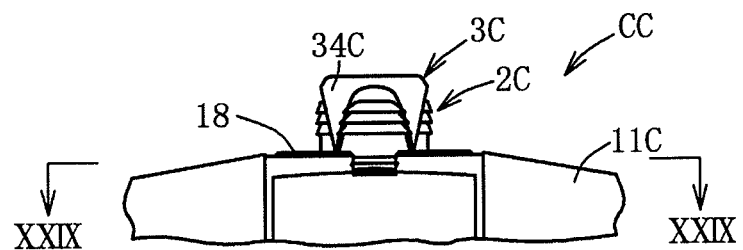
FIG. 28 is an enlarged elevation view of essential portions of the clamping device in a state in which a clamp rod is shifted 1 mm downwards.
Figure 29:
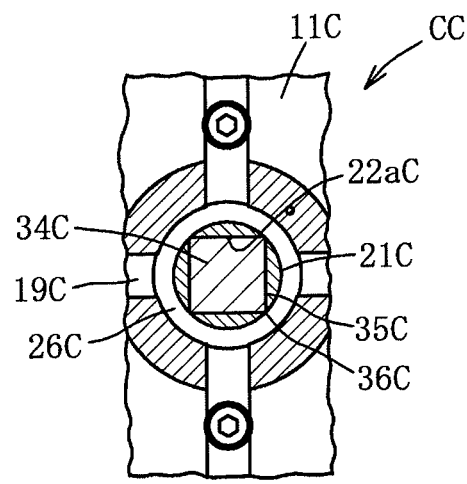
FIG. 29 is a sectional view taken along line XXIX-XXIX of FIG. 28.
Figure 30:
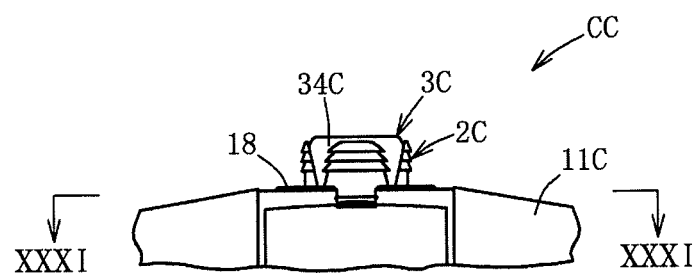
FIG. 30 is an enlarged elevation view of essential portions of the clamping device in a state in which the clamp rod is shifted 3.6 mm downwards.
Figure 31:
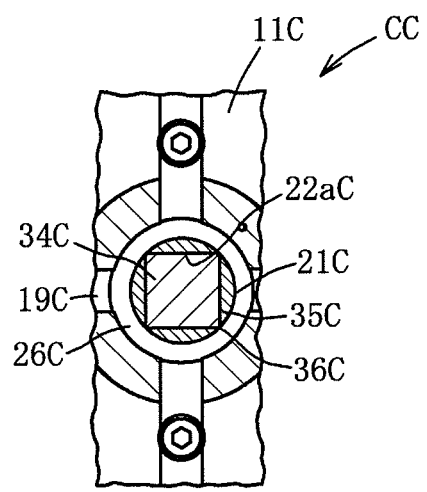
FIG. 31 is a sectional view taken along line XXXI-XXXI of FIG. 30.
Figure 32:
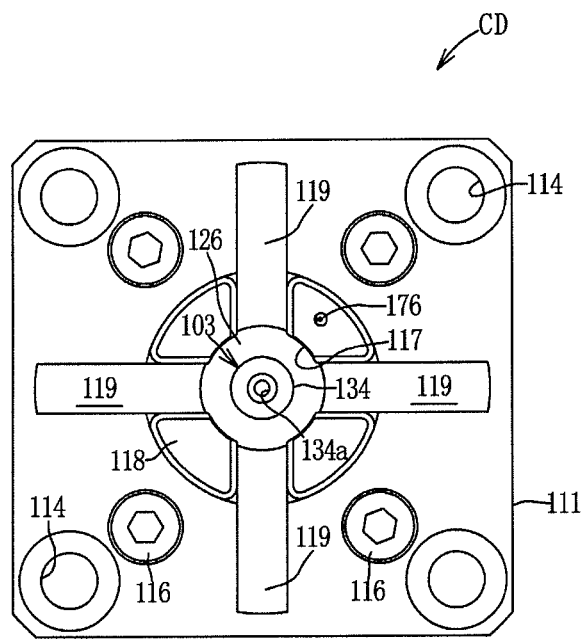
FIG. 32 is a plan view of a clamping device according to Embodiment #5.
Figure 33:
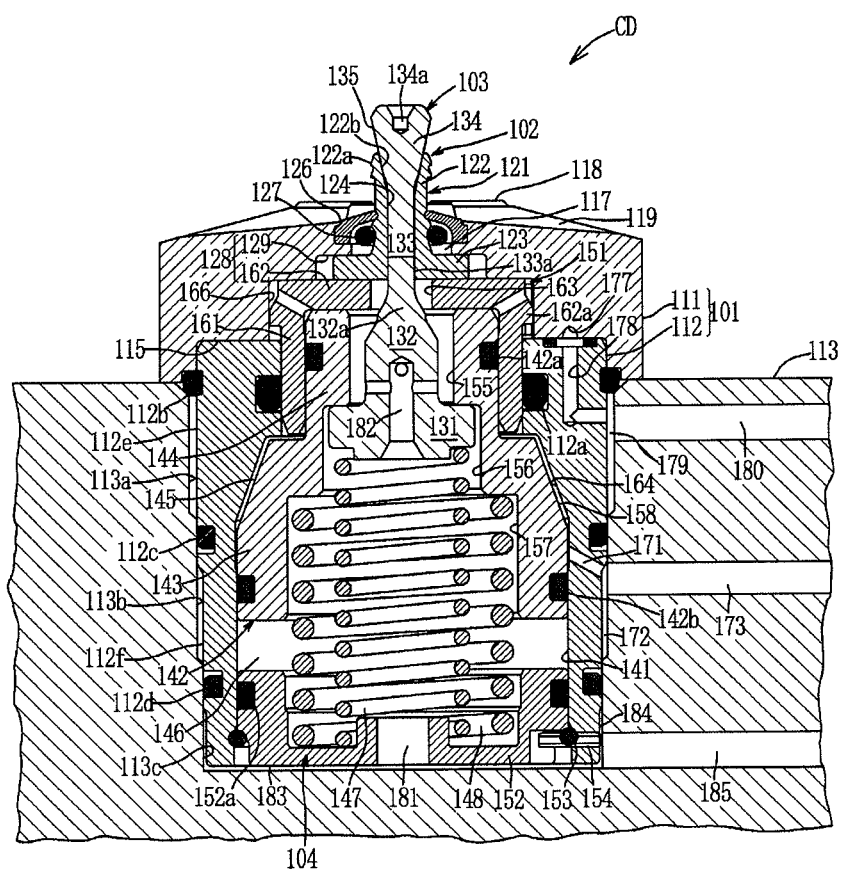
FIG. 33 is a sectional view of the clamping device in the unclamped state.
Figure 34:
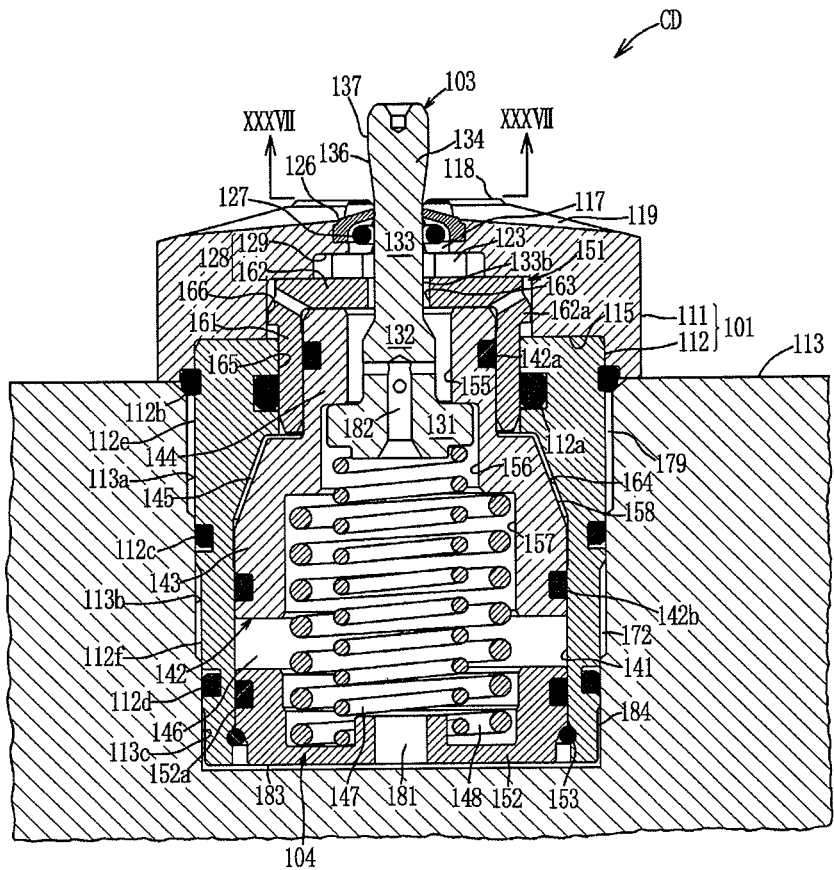
FIG. 34 is a sectional view of the clamping device in the unclamped state.

With the clamping device CC, when from the unclamped state of FIGS. 26 and 27 the clamp rod 3C is shifted downwards as shown in FIGS. 28 and 30, and the gripping assembly 2C is driven so that its diameter is increased, the external diameter of the circular cross section of the four grip forming members 21C and the clamp rod 3C is gradually increased, and, as shown in FIGS. 29 and 31, the internal circumferential portion of the scraper 26C is elastically deformed in the circumferential direction and in the radial direction.

Next, the drive means 4C will be explained.

As shown in FIG. 26, the drive means 4 is constituted with a hydraulic cylinder that drives the clamp rod 3C forwards and backwards with respect to the clamp main body 1C by hydraulic pressure. The drive means 4C comprises a vertically oriented cylindrical hole 61 that is formed in the lower main body portion 12C and the base member 13C, a piston member 62 that comprises a piston portion 65 and a tubular piston rod 66 that extends upwards from the piston portion 65, a hydraulic chamber 63 for clamping above the piston portion 65, and a hydraulic chamber 64 for unclamping below the piston portion 65. Hydraulic pressure is supplied to the hydraulic chamber 63 for clamping via a hydraulic passage from a hydraulic pressure supply source (not shown in the figure). And hydraulic pressure is supplied from a hydraulic pressure supply source 81 via a hydraulic passage 81a to the hydraulic chamber 64 for unclamping.

The bottom surface of the cylindrical hole 61 is blocked by the base member 13C. The piston member 62 is received and stopped by the bottom wall surface of the hole in the base member 13C, thus reaching its lower limit position. A small diameter hole 62a is formed in the upper portion of the piston member 62, a medium diameter hole 62b is formed in its intermediate portion, and a large diameter hole 62c is formed in its lower portion. A blocking member 67 is installed in the lower portion of the medium diameter hole 62b and in the large diameter hole 62c, and is held therein by a stop ring 68. The external peripheral portion of the piston portion 65 is sealed in an oil tight manner by a seal member, the external peripheral portion of the tubular piston rod 66 is sealed in an oil tight manner by a seal member, and the external peripheral portion of the blocking member 67 is sealed in an oil tight manner by a seal member.

The large diameter rod section 32C of the clamp rod 3C is positioned within the small diameter hole 62a, and the large diameter flange portion 31C is positioned within the medium diameter hole 62b. An annular clearance is formed between the large diameter rod section 32C and the inner circumferential surface of the small diameter hole 62a, and a thick O ring 69 is installed in an annular groove on the external periphery of the large diameter rod section 32C, with this O ring 69 being installed in a slightly compressed state between the large diameter rod section 32C and the tubular piston rod 66.

The large diameter flange portion 31C is installed between the upper wall of the medium diameter hole 62b and the blocking member 67, so as to be movable in the horizontal direction. A slight clearance is present between the outer circumferential surface of the large diameter flange portion 31C and the inner circumferential surface of the medium diameter hole 62b. For this reason, while the clamp rod 3C shifts upwards and downwards integrally with the piston member 62, it can shift relatively to the piston member 62 by a small distance in the horizontal direction orthogonally to the axis of the drive means 4C. And the gripping assembly 2C can shift integrally with the clamp rod 3C in the horizontal direction orthogonal to the above described axis.

Next, the support mechanism 5C will be explained.

As shown in FIG. 26, the support mechanism 5C comprises: an annular pressure receiving piston member 71, a support hydraulic chamber 72 that applies hydraulic pressure to a barrel portion 71a of the pressure receiving piston member 71 in the opposite direction to the clamping direction, and a hydraulic passage 73 comprising an annular hydraulic passage 73a leading from the hydraulic chamber 64 for unclamping of the hydraulic cylinder to the support hydraulic chamber 72 and a sloping throttling hydraulic passage 73b.

The pressure receiving piston member 71 comprises a barrel portion 71a, an engaging flange portion 71b that is formed at the upper end portion of the barrel portion 71a, a flat horizontal portion 71c that is formed integrally with the upper end of the barrel portion 71a, and a barrel portion 71d which extends downwards from the lower end portion of the barrel portion 71a and faces into the hydraulic chamber 63 for clamping. An annular pressure receiving surface 71e is formed on the outer periphery of the lower end of the barrel portion 71a. The pressure receiving piston member 71 is fitted over the tubular piston rod 66 so as to slide freely thereon, and is fitted into the cylindrical holes 70a and 70b of the lower main body portion 12C so as to slide freely therein.

The engaging flange portion 71b of the pressure receiving piston member 71 is installed in a reception aperture 56C that is formed in the lower main body portion 12C and the upper main body portion 11C, so as to be capable of moving upwards and downwards therein in the vertical direction. When the pressure receiving piston member 71 is in its lower limit position, the engaging flange portion 71b is received and stopped by the lower end wall of the receiving aperture 56C; and, when the pressure receiving piston member 71 is in its upper limit position, the horizontal flat portion 71c is received and stopped by the upper end wall of the receiving aperture 56C.

A support hydraulic chamber 72 is defined by the barrel portion 71a, the barrel portion 71d, and the lower main body portion 12C. The outer periphery of the barrel portion 71d is sealed in an oil tight manner by a seal member 70b. And the barrel portion 71d is inserted into a cylindrical hole 70b that is formed in the lower main body portion 12C and the tubular piston rod 66, and receives the hydraulic pressure in the hydraulic chamber 63 for clamping.

Although the following feature is omitted from the figures, it should be understood that, in a similar manner with Embodiment #1, a pressurized air introduction means is provided within the clamp main body 1C. And while, as compared with the clamping device C of Embodiment #1, this clamping device CC has a structure that is compact with respect to the height direction, since the operation and the advantages are almost the same as those of Embodiment #1, detailed explanation thereof will be omitted.

Embodiment 5

As shown in FIGS. 32 through 43, this clamping device CD has a clamp main body 101, a gripping assembly 102, a clamp rod 103, a drive means 104 that drives the clamp rod 103 forwards and backwards, a scraper 126, a guidance and support mechanism 128, and so on. The clamp main body 101 comprises an upper main body portion 111 and a lower main body portion 112, and the clamp main body 101 is attached to a base member 113.

As seen in plan view, the upper main body portion 111 is an almost square member that is made from steel. This upper main body portion 111 is fixed to the base member 113 by four bolts via four bolt holes 114. The lower main body portion 112 is a tubular member in which a cylindrical aperture 141 is formed, and the upper end portion of the lower main body portion 112 is fitted into a concave portion 115 on the lower surface side of the upper body portion 111, and is fixed there by four bolts 116.

The gripping assembly 102 is provided so as to pass vertically through a through hole 117 in the center portion of the upper main body portion 111. Four circular arcuate seating surfaces 118 are formed on the upper surface of the upper main body portion 111 so as to surround the gripping assembly 102, and, in the state in which the workpiece W has been clamped, the workpiece W is seated on these seating surfaces 118. Four concave grooves 119 are formed in the shape of a cross on the upper surface of the upper main body portion 111, and blown pressurized air flows through these. Except for the four seating surfaces 118 and the four concave grooves 119, the upper surface of the upper main body portion 111 is formed as a partially conical surface having a gentle angle of slope.

Next, the gripping assembly 102 will be explained.

As shown in FIGS. 33 through 43, along with the clamp rod 103, the gripping assembly 102 passes through the through hole 117 in the upper end portion of the clamp main body 101, is inserted into the hole H in the workpiece W, and is capable of gripping the inner circumferential surface of the hole H. This gripping assembly 102 comprises a pair of grip forming members 121 made from steel that are arranged to face one another on both sides of the clamp rod 103. The pair of grip forming members 121 can be expanded and shrunk in the radial direction. Grip claw sections 122 are formed at the upper portions of the grip forming members 121, and base end flange portions 123 shaped as horizontal semicircular arcs are formed at the lower end portions of the grip forming members 121. Straight flat surfaces 124 are formed on the inner surfaces of the grip forming members 121, from intermediate portions thereof to their lower end portions.

The length of the grip claw sections 122 in the vertical direction is about ⅓ of the total height of the gripping assembly 102. The cross sections of the grip claw sections 122 orthogonal to the axis of the clamp rod 103 are formed into flattened letter D shapes, and tapered surfaces 122b that are offset away from the axis of the clamp rod 103 progressively in the upward direction are formed on the inner surfaces of these grip claw sections 122, with these tapered surfaces 122b being adapted to engage closely with tapered flat surfaces 135 of a tapered section 134 of the clamp rod 103. Teeth 122a are formed in two steps on the outer circumferential surfaces of the grip claw sections 122, for easily gripping the inner circumferential surface of the hole H in the workpiece W.

Figure 35:
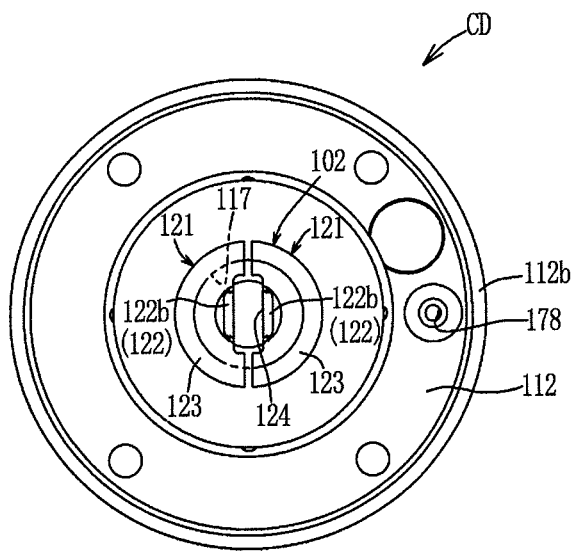
FIG. 35 is a plan view of the clamping device in a state in which an upper body portion, a clamp rod, a scraper, and an O ring are removed.
Figure 36:
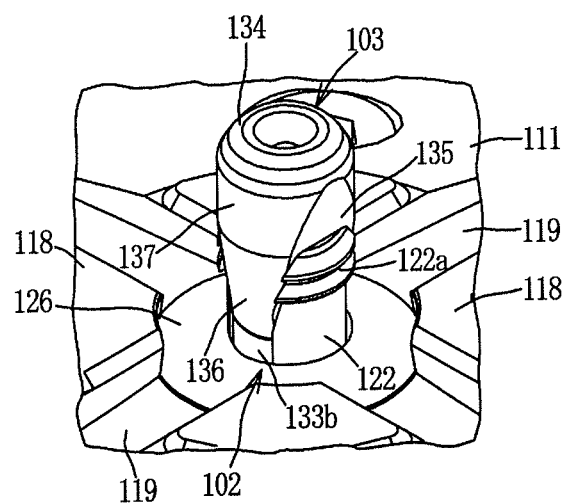
FIG. 36 is an enlarged perspective view of essential portions of a gripping assembly and the clamp rod.

As shown in FIG. 35, the two end portions in the circumferential direction of the base end flange portions 123 of the grip forming members 121 are projected more towards the side of the clamp rod 103 than the grip claw sections 122. Slight clearances are opened between these pairs of base end flange portions 123.

As shown in FIGS. 33, 34, 38, and 41, a guidance and support mechanism 128 is provided in the interior of the clamp main body 101 that guides and supports the pair of base end flange portions 123 of the pair of grip forming members 121 so that they are shiftably in the horizontal direction. The base end flange portions 123 are received within a concave circular portion 129 of the upper main body portion 111, and are held between an upper wall portion of the concave circular portion 129 and a flat horizontal portion 162 of an annular pressure receiving member 151 so as to be movable in the horizontal direction. This concave circular portion 129 and the horizontal flat portion 162 are equivalent to the guidance and support mechanism 128.

As shown in FIGS. 32 through 34 and FIGS. 36 through 43, a scraper 126 that blocks the annular clearance at the outer peripheral surfaces of the gripping assembly 102 and the clamp rod 103 is installed in the through hole 117 of the upper main body portion 111, with the scraper 126 being made from a material that has resilience such as rubber or synthetic resin or the like, and sliding in contact with the outer circumferential surface of the gripping assembly 102 and the clamp rod 103. The scraper 126 is a member that prevents ingress of foreign matter such as swarf or the like from the annular clearance between the outer peripheral surface of the gripping assembly 102 and the clamp rod 103 into the interior of the clamp device, that makes it more difficult for pressurized air to leak out from within the clamp body to the exterior, and that holds together the pair of grip forming members 121 and the clamp rod 103. An O ring 127 is installed on the intermediate portion of the gripping assembly 102, and biases the pair of grip forming members 122 into which it is divided in the inward radial direction (i.e. in the direction in which they mutually approach one another).

The gripping assembly 102 is installed so as to be capable of being raised and lowered by the drive means 104 integrally with the annular pressure receiving member 151 through a small distance only, and so as, due to the annular clearance at the external peripheral portion of the concave circular portion 129 and via elastic deformation of the scraper 126, to be shiftable by a small distance in the horizontal direction orthogonally to the axis of the drive means 104 (in other words, to the axis of the clamping device CD).

Next, the clamp rod 103 will be explained.

As shown in FIGS. 32 through 34 and FIGS. 36 through 43, the clamp rod 103 extends in the vertical direction so as to pass through the straight flat surfaces 124 of the gripping assembly 102, and moreover is engaged with the gripping assembly 102. The clamp rod 103 comprises a large diameter flange portion 131 at its lower end portion, a large diameter rod section 132 that continues upward from the large diameter flange portion 131, an intermediate rod section 133 that continues upwards from the large diameter rod section 132, an intermediate rod section 133 that continues upwards from this small diameter rod section 132 via a tapered rod section 132a, and a tapered section 134 that is formed at its upper end portion to continue upwards from the intermediate rod section 133, and that is capable of driving the pair of grip forming members 121 in the direction to increase the external diameter thereof. The horizontal cross section of the large diameter rod section 132 is circular.

The horizontal cross section of the intermediate rod section 133 is formed into a flattened elliptical shape having long sides that are parallel to the tapered flat surfaces 135 of the tapered section 134. The upper end portions of the opposing long edge surfaces 133a of the intermediate rod section 133 continue into the lower end portions of the tapered flat surfaces 135 of the tapered section 134. And the upper end portions of the opposing short side partial cylindrical surfaces 133b of the intermediate rod section 133 continue into the lower end portions of the partial conical surfaces 136 of the tapered section 134. The lower end portions of the long edge surfaces 133a and of the short side partial cylindrical surfaces 133b continue into the outer surface of the upper end of the tapered rod section 132a.

As shown in FIGS. 33, 34 and 36 through 40, the tapered section 134 has a pair of tapered flat surfaces 135 that are contacted against the grip claw sections 122 of the pair of grip forming members 121 and whose offset distance increases in the upward direction, the partial conical surfaces 136 that are formed between the edges of the lower portions of these tapered flat surfaces 135 and whose radiuses increase progressively upwards, and partial cylindrical surfaces 137 that continue upwards above the partial conical surfaces 136. The tapered flat surfaces 135 are formed along the total length of the tapered section 134 in the vertical direction. A central hole 134a is formed in the central portion of the upper end of the tapered section 134. The horizontal cross section of the lower portion of the tapered section 134 is formed into an elliptical shape having long sides that are parallel to the tapered flat surfaces 135.

Figure 37:
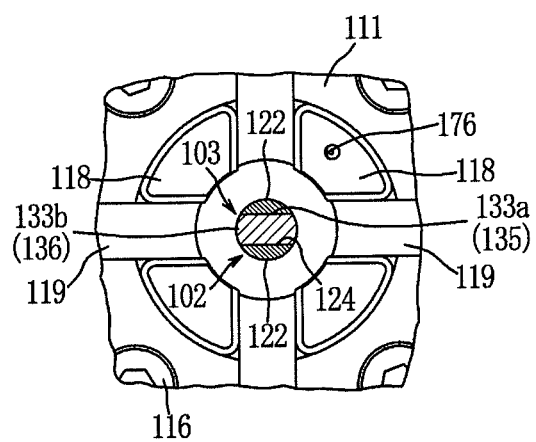
FIG. 37 is a sectional view taken along line XXXVII-XXXVII of FIG. 34.
Figure 40:
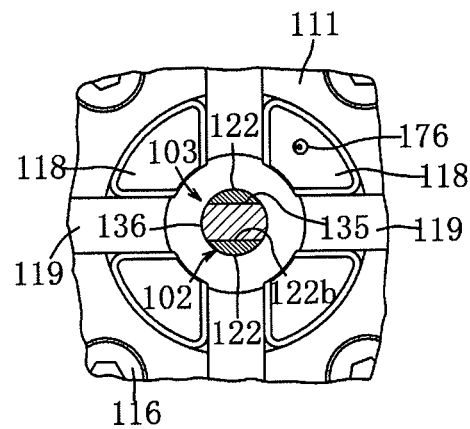
FIG. 40 is an enlarged sectional view of essential portions of the gripping assembly and the clamp rod (in the clamped state)
Figure 43:
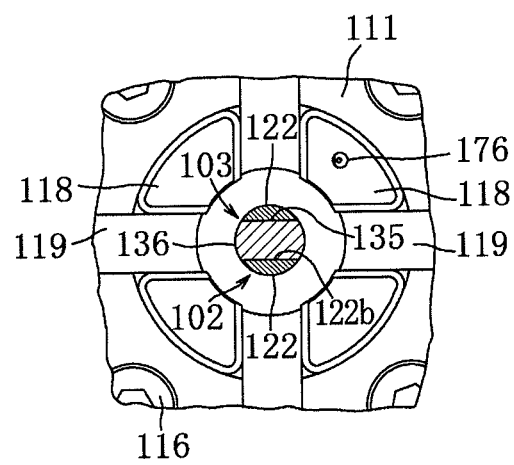
FIG. 43 is an enlarged sectional view of essential portions of the gripping assembly and the clamp rod in the full stroke state.

In the vicinity of the scraper 126, the external shape of the pair of grip forming members 121 and the clamp rod 103 orthogonal to the axis of the clamp rod 103 is formed as cylindrical. In other words, the cross section of the pair of grip forming members 121 and the clamp rod 103 orthogonal to the axis of the clamp rod 103 is formed as circular. When the gripping assembly 102 is driven so that its diameter is increased, this external cylindrical shape is increased in size, and, as shown in FIGS. 37, 40, and 43, the internal circumferential portion of the scraper 126 is elastically deformed in the circumferential direction and in the radial direction.

Next, the drive means 104 will be explained.

As shown in FIGS. 33, 34, 38, and 41, the drive means 104 is a system that drives the gripping assembly 102 and the clamp rod 103 to advance and retract in their axial direction (i.e. in the vertical direction), and drives so as to clamp by the hydraulic force of a hydraulic cylinder, while driving release of clamping by the elastic force of coil springs 147 and 148.

This drive means 104 comprises a vertically oriented cylindrical hole 141 that is formed in the lower main body portion 112, a tubular piston member 142 that includes a piston portion 143 installed in the cylindrical hole 141 and a tubular piston rod 144 that extends upwards from the piston portion 143, a hydraulic chamber 145 for clamping above the piston member 142, a spring reception chamber 146 below the piston member 142, the small diameter coil spring 147 and the large diameter coil spring 148 that are received in the spring reception chamber 146 in the compressed state, and so on. The hydraulic chamber 145 for clamping is defined by the lower main body portion 112, the piston member 142, and the pressure receiving piston member 151.

A blocking member 152 is installed in the lower end portion of the cylindrical hole 141, with the blocking member 152 being held in by a stop ring 153 and its rotation being regulated by a rotation regulation pin 154. The external peripheral portion of the blocking member 152 is sealed by a seal member 152a in an air tight manner. It should be understood that, when the piston member 142 is in its lower limit position, it is received and stopped by the upper end surface of the blocking member 152. The lower ends of the coil springs 147 and 148 are received and stopped by the blocking member 152, and the upper end of the coil spring 147 is received and stopped by the large diameter flange portion 131 of the clamp rod 103, while the upper end of the coil spring 148 is received and stopped by the piston member 142. The clamp rod 103 is biased upwards by the coil spring 147 and contacts against the lower end of the tubular piston rod 144. And the piston member 142 is biased upwards (i.e. towards the clamp release side) by the coil springs 147 and 148.

A small diameter hole 155 is formed in the upper portion of the piston member 142, a medium diameter hole 156 is formed in its intermediate portion, and a large diameter hole 157 is formed in its lower portion. A tapered outer circumferential surface 158 is formed on the intermediate portion of the external periphery of the piston member 142. The external peripheral portion of the piston member 142 is sealed by seal members 142a and 142b in an oil tight manner.

The large diameter flange portion 131 of the clamp rod 103 is received within the medium diameter hole 156, and the large diameter rod section 132 of the clamp rod 103 is positioned within the small diameter hole 155. An annular clearance is present at the outer periphery of the large diameter flange portion 131, and an annual clearance is present at the outer periphery of the large diameter rod section 132. And an annular clearance is present at the outer periphery of the circular aperture 163. For this reason, the clamp rod 103 is shifted by the biasing force of the coil spring 147 and by the hydraulic force that acts on the piston member 142 so as to be raised and lowered integrally with the piston member 142, and can only be relatively shifted by a small distance with respect to the piston member 142 in the horizontal direction that is orthogonal to the axis of the drive means 104 (in other words, that is orthogonal to the axis of the clamping device CD).

The pressure receiving piston member 151 comprises a barrel portion 161 and a horizontal flat portion 162 that extends from the upper end of the barrel portion 161, and the base end flange portion 123 of the gripping assembly 102 is mounted on and supported by the upper surface of this horizontal flat portion 162. The intermediate rod section 133 of the clamp rod 103 is passed through the circular aperture 163 in the central portion of the horizontal flat portion 162 with a certain clearance remaining between them, and an engagement flange 162a having slightly larger diameter than the barrel portion 161 is formed on the external peripheral portion of the horizontal flat portion 162. The cylindrical hole 141 includes an intermediate cylindrical hole 164 having a tapered inner circumferential surface, and an upper cylindrical hole portion 165 formed at its upper end portion.

A reception aperture 166 that continues at the upper end of the upper cylindrical hole portion 165 is formed in the upper main body portion 111. The depth of the reception aperture 166 is slightly greater than the thickness of the engagement flange 162a. The barrel portion 161 of the pressure receiving piston member 151 is installed in a tubular cylindrical aperture between the inner circumferential surface of the upper cylindrical hole portion 165 and the tubular piston rod 144 so as to be able to slide freely in the vertical direction, and the internal periphery of the barrel portion 161 is sealed by a seal member 142a, while its outer periphery is sealed by a seal member 112a. And the horizontal flat portion 162 is installed in the reception aperture 166 so as to be movable in the vertical direction.

The lower end of the barrel portion 161 of the pressure receiving piston member 151 faces into the hydraulic chamber 145 for clamping and receives the hydraulic pressure therein. The hydraulic chamber 145 for clamping is connected to a hydraulic pressure supply source (not shown in the figures) via a hydraulic passage 171 formed in the lower main body portion 112, an annular gap 172 between the lower main body portion 112 and the base member 113, and a hydraulic passage 173 that is formed in the base member 113.

As shown in FIGS. 32, 33, 38, and 41, a seating sensor is provided that, in the state in which the workpiece W is clamped, detects the fact that the lower surface of the workpiece W is in close contact with the seating surface 118. This seating sensor includes a pressurized air ejection hole 176 that opens to one of the seating surfaces 118, air passages 177 and 178 within the upper main body portion 111 and the lower main body portion 112 that communicate with the pressurized air ejection hole 176, the annular gap 179 between the lower main body portion 112 and the base member 113, an air passage 180 within the base member 113, a pressure switch (not shown in the figure) that, in the state in which pressurized air is supplied via these air passages to the pressurized air ejection hole 176 from a pressurized air supply source (not shown in the figures), detects the fact that the pressure of the pressurized air in the air passage 180 has risen up to or above a set pressure, and so on.

As shown in FIGS. 33, 34, 38, and 41, an installation hole in which the lower main body portion 112 is installed is formed in the base member 113, and this installation hole has a large diameter hole 113a at its upper portion, a medium diameter hole 113b formed at its intermediate portion whose diameter is slightly smaller than that of the large diameter hole 113a, and a small diameter hole 113c formed at its lower end portion whose diameter is slightly smaller than that of the medium diameter hole 113b. The lower main body portion 112 comprises a large diameter portion 112e that is formed at its upper half portion, and a small diameter portion 112f formed at its lower half portion whose diameter is smaller than that of the large diameter portion 112e. The large diameter portion 112e is fitted into the large diameter hole 113a and the upper end portion of the medium diameter hole 113b, with an annular gap 179 being defined between the outer circumferential surface of this large diameter portion 112e and the inner circumferential surface of the large diameter hole 113a, and with sealing members 112b and 112c being installed near the upper end and at the lower end portion of the large diameter portion 112e.

The small diameter portion 112f is fitted into the medium diameter hole 113b and the small diameter hole 113c, with an annular gap 172 being defined between the outer circumferential surface of the small diameter portion 112 and the inner circumferential surface of the medium diameter hole 113b, and with a seal member 112d being installed on the small diameter portion 112 at a location that corresponds to the upper end portion of the small diameter hole 113c.

An air supply hole 181 is formed at the central portion of the blocking member 152, and an air passage 182 is formed within the clamp rod 103. The air supply hole 181 is connected to a pressurized air supply source via a lower end clearance 183 and an annular clearance 184 between the lower main body portion 112 and the base member 113, and via an air passage 185 within the base member 113. Pressurized air supplied from the pressurized air supply source flows towards the four seating surfaces 118 through the air passage 185, the annular clearance 184, the lower end clearance 183, the air supply hole 181, the spring reception chamber 146, the air passage 182 within the clamp rod 103, the small diameter hole 155, the circular aperture 163, and the clearance between the pair of grip forming members 121 and the clamp rod 103, and is blown against the four seating surfaces 118.

The external circumferential portion of the lower main body portion 112 is sealed in an air tight or oil tight manner by a plurality of seal members 112b through 112d. Since the annular clearances 172, 179, and 184 described above are formed so that their diameters decrease downwards, accordingly, when the clamp main body 101 is to be fitted in the installation hole 113a of the base member 113, it is possible reliably to prevent the seal members 112b through 112d from being damaged by the edge portions where the hydraulic passage 173 and the air passages 180 and 185 open to the clearances 172, 179, and 184. Moreover the freedom for configuring the hydraulic passage 173 and the air passages 180 and 185 and for arranging their directions (in other words, the freedom in their design), is enhanced, since, when the hydraulic passage 173 and the air passages 180 and 185 are formed in the base member 113, it is sufficient for these to be communicated with the annular clearances 172, 179, and 184 respectively. In particular, even if the workpiece W is only contacted against one portion of the seating surfaces 118, since it is arranged for pressurized air to be supplied to the pressurized air ejection hole 176 via the annular clearance 179, accordingly it is possible to adjust the position of the pressurized air ejection hole 176 according to the shape of the workpiece W, by only adjusting the position of the clamp main body 101 in the circumferential direction.

Now, the operation of the clamping device CD will be explained. When the workpiece W is to be clamped by the clamping device CD, initially, the hydraulic pressure in the hydraulic chamber 145 for clamping is drained to drain pressure. When this is done, due to the biasing force of the coil springs 147 and 148 in the spring reception chamber 146, as shown in FIGS. 33, 34, 36, and 37, the clamp rod 103, the gripping assembly 102, the tubular piston member 142, and the pressure receiving piston member 151 are raised and brought to their upper limit positions. At this time, the gripping assembly 102 is kept in its contracted state by the scraper 126 and the O ring 127, and, in the vicinity of the scraper 126, a cylindrical external shape is defined that is made up from the pair of grip forming members 121 and the partial cylindrical surfaces 133b on the pair of short sides of the clamp rod 103 (refer to FIG. 37). In other words, the cross section of the clamp rod 103 and the pair of grip forming members 121 orthogonal to the axis of the clamp rod 103 becomes circular. Since, due to this, almost no clearance is generated between the clamp rod 103 and the pair of grip forming members 121, and the scraper 126, accordingly the amount of leakage to the exterior of the blown pressurized air becomes very low, and the amount of consumption of the pressurized air becomes very small.

Next, the workpiece W is brought close, the gripping assembly 102 and the clamp rod 103 are inserted into the hole H in the workpiece W, and the workpiece W is supported by the seating surfaces 118. And next, hydraulic pressure is supplied to the hydraulic chamber for clamping 145, so that hydraulic force acts on the tubular piston member 142 in the downwards direction. When this is done, the pressure receiving member 151 receives the hydraulic pressure in the hydraulic chamber 145 for clamping and is held in its upper limit position, and, although the gripping assembly 102 is also held in its upper limit position, the tubular piston member 142 is driven downwards against the resistance of the biasing force of the coil springs 147 and 148 due to the hydraulic force in the downward direction, so that the clamp rod 103 is shifted downwards relatively to the gripping assembly 102.

Figure 38:
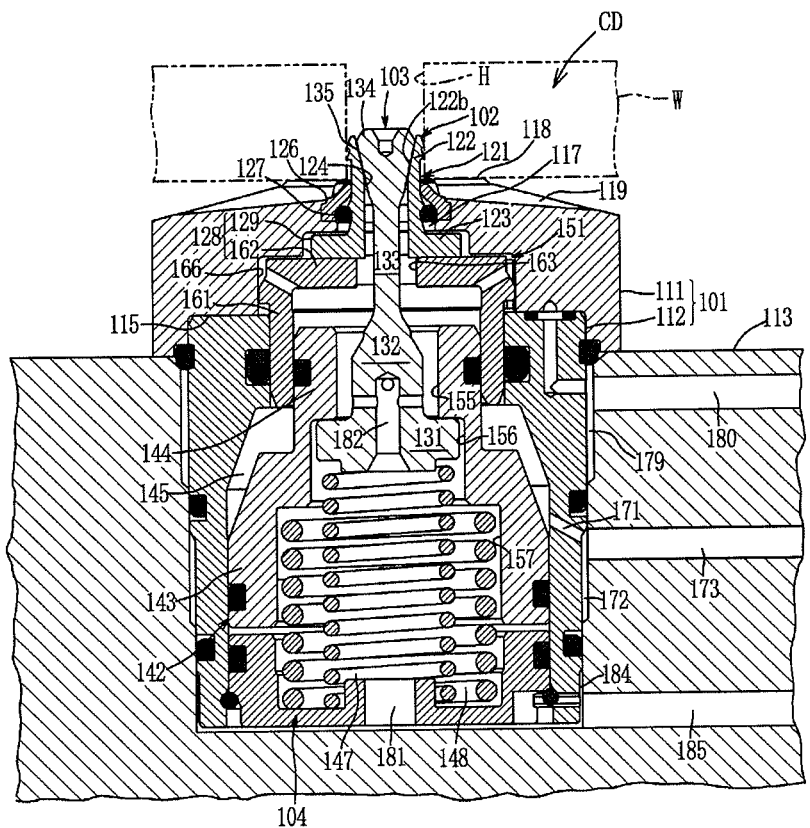
FIG. 38 is a sectional view of the clamping device in the clamped state.
Figure 39:
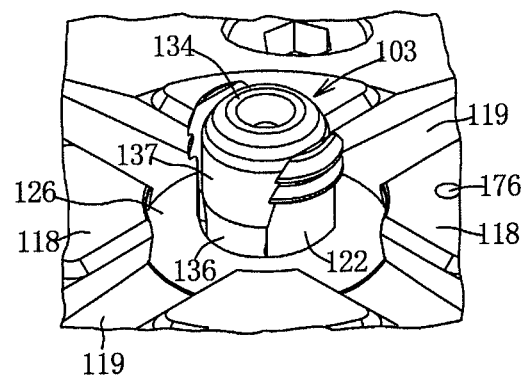
FIG. 39 is an enlarged perspective view of essential portions of the gripping assembly and the clamp rod (in the clamped state)

As a result, the pair of grip claw sections 122 of the gripping assembly 102 are driven by the pair of tapered flat surfaces 135 of the tapered section 134 of the clamp rod 103 so that their diameter is increased, and they bite into the inner circumferential surface of the hole H in the workpiece W and are brought into a state in which they are engaged therewith (this is the gripping state), so that it becomes impossible for the gripping assembly 102 to shift relatively to the clamp rod 103. From this state, as shown in FIGS. 38 through 40, the tubular piston member 142, the gripping assembly 102, the clamp rod 103, and the pressure receiving piston member 151 are driven downwards by a small distance (for example, 0.2 mm) integrally as a unit, and the workpiece W stops in the clamped state in which it is being strongly pulled against the seating surfaces 118. At this time, since the diameter of the partial conical surfaces 136 in the vicinity of the scraper 126 becomes greater along with the shifting downwards of the tapered section 134, accordingly the external diameter of the circular cross section of the grip forming members 121 and the partial conical surfaces 136 becomes larger, and the internal circumferential portion of the scraper 126 is elastically deformed both in the circumferential direction and also in the radial direction, so that a state is attained in which a certain clearance is generated between the scraper 126, and the gripping assembly 102 and the clamp rod 103.

Figure 41:
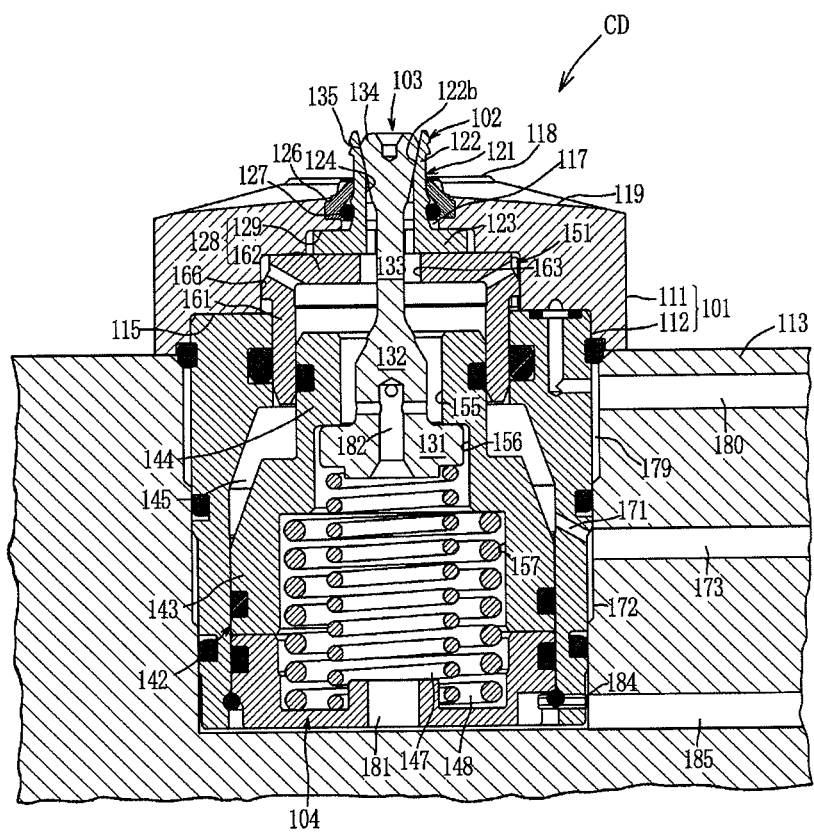
FIG. 41 is a sectional view of the clamping device in a full stroke state.
Figure 42:
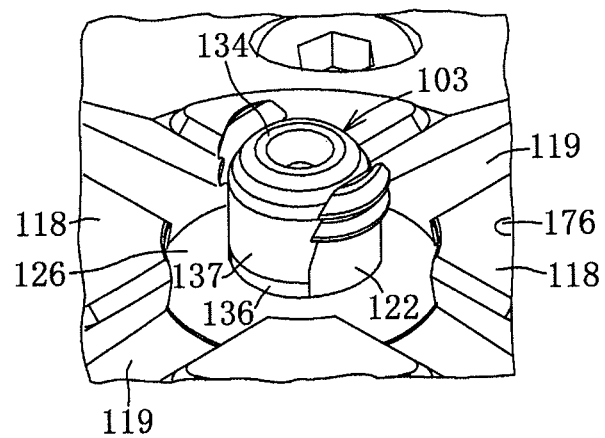
FIG. 42 is an enlarged sectional view of essential portions of the gripping assembly and the clamp rod in the full stroke state.

It should be understood that, when hydraulic pressure is supplied to the hydraulic chamber 145 for clamping in the full stroke state of the clamping device CD in the state in which no workpiece W is loaded, hydraulic force acts on the tubular piston member 142 in the downwards direction, and, as shown in FIGS. 41 through 43, with the pressure receiving piston member 151 and the gripping assembly 102 held in their upper limit positions, the tubular piston member 142 shifts to its lower limit position and contacts against the blocking member 152, and the grip claw sections of the gripping assembly 102 are driven by the tapered section 134 of the clamp rod 103 in the direction to increase their external diameter to the maximum limit. At this time, in the vicinity of the scraper 126, the external diameter of the circular cross section of the grip forming members 121 and the partial conical surfaces 136 becomes maximum, and the scraper 126 is elastically deformed to the maximum limit in the circumferential direction and in the radial direction, so that a state is reached in which no clearance is generated between the scraper 126, and the gripping assembly 102 and the clamp rod 103.

The advantage of the clamping device CD will now be explained.

Since the edges of the pair of grip forming members 121 do not project further than the outer surface of the clamp rod 103 in the vicinity of the scraper 126, accordingly it is possible to ensure the durability of the scraper 126, because it is ensured that the scraper 126 does not suffer any damage from the edges of the pair of grip forming members 121.

Since the horizontal cross section of the intermediate rod section 133 is formed in a flattened elliptical shape having long sides parallel to the tapered flat surfaces 135, accordingly, even in the case of a compact clamping device, it is possible to ensure good strength for the clamp rod 103 against pulling by making the horizontal cross sectional area of the intermediate rod section 133 as large as possible, while still ensuring space for disposing the pair of grip forming members 121 on both sides of the intermediate rod section 133.

Since the horizontal cross section of the lower half portion of the tapered section 134 is formed in an elliptical shape having long sides parallel to the tapered flat surfaces 135, accordingly, between the circular ends of the lower half portions of these tapered flat surfaces 135, it is possible to form the partial conical surfaces 136 so that their radiuses become greater in the upward direction; and since, in the vicinity of the scraper 126, it is possible to form the cross section of the pair of grip forming members 121 and the clamp rod 103 as circular, accordingly it is possible to ensure the durability of the scraper 126. Other advantages that are obtained are almost the same as those obtained with Embodiment #1.

Now, although the base end flange portions 123 of the grip forming members 121 are guided and supported by the guidance and support mechanism 128 so as to be shiftable in the horizontal direction, nevertheless, during driving for clamping, tipping rotational moments act on the grip forming members. Although the grip forming members that are employed in a compact clamping device are compact, since the width of the base end flange portions 123 of the grip forming members 121 that resist the tipping moments is also small, accordingly it is also difficult to ensure the stability of the grip forming members 121 to resist these tipping moments. Due to this, the semicircular arcuate horizontal base end flange portion 123 is provided at the lower end portion of each of the grip forming members 121, and the guidance and support mechanism 128 that guides and supports the pair of base end flange portions 123 of the pair of grip forming members 121 so that they are shiftable in the horizontal direction is provided to the clamp body 101; and thus, during driving for clamping, since at least the one end portions in the circumferential direction of the base end flange portions of the gripping assemblies 102 are projected more towards the clamp rod 103 than the grip claw sections 122, accordingly it is possible to enhance the stability for resisting the tipping moments that act on the grip forming members 121.

Since the clamp rod 103 and the gripping assembly 102 are adapted to be movable through only a small distance in the horizontal direction orthogonally to the axis of the clamping device CD, accordingly, if a plurality of holes H in a workpiece W are to be clamped with a plurality of clamping devices CD, still it is possible to clamp the workpiece W with the plurality of clamping devices C, even if there is some deviation due to manufacturing error so that the distance between the axes of the clamping devices CD does not accurately agree with the distance between the centers of the holes H.

Figure 44:
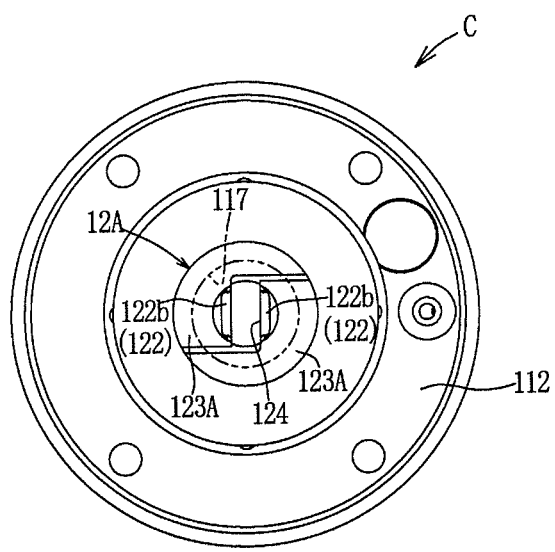
FIG. 44 is a plan view of a clamping device according to a variant embodiment, in a state in which an upper body portion, a clamp rod, a scraper, and an O ring are removed.

It should be understood that, in the above clamping device CD, it would also be acceptable, as shown in FIG. 44, to elongate at least one of the end portions of the base end flange portions 123A of the gripping assembly 102a in the circumferential direction, and to form each of the base end flange portions 123A in an almost letter J shape as seen in plan view.

Next, variant examples in which the above embodiment is partially altered will be explained.

[1] While hydraulic pressure is employed for driving the clamping devices described in Embodiments #1 through #4 above to be clamped and to be unclamped, this is not necessarily limitative; instead of providing a hydraulic chamber for clamping and a hydraulic chamber for unclamping, it would also be acceptable to adopt a structure in which an air chamber for clamping and an air chamber for unclamping are provided, and in which a piston member is driven for clamping and for unclamping by employing a pressurized fluid such as pressurized air or the like. Moreover, it would also be acceptable to arrange to generate a clamping force with a spring, and to generate an unclamping force by fluid pressure.

[2] In the clamping devices described in Embodiments #1 through #5 above, the structures of the gripping assemblies, the structures of the clamp rods, the structures of the support mechanisms, and so on are given by way of example; various changes and additions to these structures could be implemented, provided that the gist of the present invention is adhered to. It would also be possible to implement various changes and additions to other structures for the clamping device, within the range in which the gist of the present invention is maintained.

The present invention can be applied to clamping devices of various types with which it is arranged to grip to and to clamp to the inner circumferential surface of a hole in a workpiece by, with a clamp rod, increasing the diameter of grip claw portions of a gripping assembly that has been inserted into the hole, in order to supply the workpiece to machining, and these clamping devices can also be applied to conveyance of a workpiece or the like.

DESCRIPTION OF NUMERALS

C, CA~CD: clamping devices
1, 1C: clamp bodies
2, 2A~2C: gripping assemblies
3, 3A~3C: clamp rods
4, 4C: drive means
21, 21A~21C: grip forming members
22, 22A~22C: grip claw sections
22a, 22aA~22aC: tapered surfaces
23, 23A~23C: base end flange portions
24, 24A~24C: straight flat surfaces
26: scraper
33, 33A~33C: intermediate rod sections
33a, 33aA~33aC: straight surfaces
34, 34A~34C: tapered sections
35, 35A~35C: tapered flat surfaces
36, 36A~36C: partial conical surfaces

The invention claimed is:

1. A clamping device comprising a clamp main body, a gripping assembly that passes through a through hole in an upper end portion of the clamp main body and extends upwards and is capable of gripping an inner circumferential surface of a hole in a workpiece, a clamp rod that extends in a vertical direction and is engaged with the gripping assembly, a scraper made from rubber or synthetic resin that blocks an annular clearance on an outer circumferential surface of the gripping assembly and the clamp rod within the through hole, a drive means that drives the clamp rod forwards and backwards, wherein;

the gripping assembly comprises one or a plurality of grip forming members positioned at an outer circumference of the clamp rod;

the clamp rod comprises an intermediate rod section at an intermediate portion, and a tapered section at its upper end side portion that continues upwards from the intermediate rod section, that is formed so that its external diameter increases progressively upwards, and so that it is capable of driving the one or a plurality of grip forming members in a direction to increase their external diameter;

the tapered section has one or a plurality of tapered flat surfaces that contact with a grip claw section or sections of the one or a plurality of grip forming members in a surface contacting manner, and one or more partial conical surfaces having radius increasing progressively upwards each of which is formed respectively between edges of lower portions of the one or a plurality of tapered flat surfaces; and in the vicinity of the scraper, the cross section of the one or a plurality of grip forming members and the clamp rod orthogonal to an axis of the clamp rod is formed as circular throughout an unclamping state to a clamping state.

2. A clamping device according to claim 1, wherein, in an unclamped state, a lower end portion of the partial conical surface of the clamp rod contacts with the scraper.

3. A clamping device according to claim 1, wherein the cross section of the grip claw section of the grip forming member orthogonal to the axis of the clamp rod is formed in a flattened letter D shape.

4. A clamping device according to claim 1, wherein tilt angles of the tapered flat surface and of the partial conical surface with respect to the axis of the clamp rod are formed so as to be the same.

5. A clamping device according to claim 1, wherein:
the gripping assembly comprises three grip forming members that are disposed at regular intervals around the outer circumferential surface of the clamp rod;
a straight surfaces is formed respectively on the intermediate rod section, continuing from the lower end portion of the tapered flat surface, and parallel to the axis of the clamp rod; and
the horizontal cross section of a lower portion of the tapered section is formed into a triangular shape having sides that are parallel to the tapered flat surfaces, and whose vertex portions are formed into circular arcs.

6. A clamping device according to claim 1, wherein:
the gripping assembly comprises a pair of grip forming members that are disposed to oppose one another on opposite sides of the clamp rod;
the horizontal cross section of the intermediate rod section is formed into a flattened elliptical shape having long sides parallel to the tapered flat surfaces, and
the horizontal cross section of a lower portion of the tapered section is formed into an elliptical shape having long sides parallel to the tapered flat surfaces.

* * * * *